US008650063B2

(12) United States Patent
Yano et al.

(10) Patent No.: US 8,650,063 B2
(45) Date of Patent: Feb. 11, 2014

(54) PROGRAM, METHOD AND APPARATUS FOR MODELING WORKFLOW

(75) Inventors: Keisuke Yano, Kawasaki (JP); Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1152 days.

(21) Appl. No.: 12/289,703

(22) Filed: Oct. 31, 2008

(65) Prior Publication Data

US 2009/0076877 A1 Mar. 19, 2009

Related U.S. Application Data

(63) Continuation of application No. PCT/JP2006/325809, filed on Dec. 25, 2006.

(30) Foreign Application Priority Data

May 16, 2006 (JP) ................................ 2006-136518

(51) Int. Cl.
G06Q 10/00 (2012.01)
(52) U.S. Cl.
USPC .......................................... 705/7.27
(58) Field of Classification Search
USPC .......................................... 705/7.27
See application file for complete search history.

(56) References Cited

U.S. PATENT DOCUMENTS

| 6,006,193 | A | * | 12/1999 | Gibson et al. | 705/7.26 |
| 6,038,538 | A | | 3/2000 | Agrawal et al. | |
| 6,278,977 | B1 | * | 8/2001 | Agrawal et al. | 705/7.27 |
| 6,865,371 | B2 | * | 3/2005 | Salonidis et al. | 455/41.1 |
| 7,065,566 | B2 | * | 6/2006 | Menard et al. | 709/223 |
| 7,096,222 | B2 | * | 8/2006 | Kern et al. | 1/1 |
| 7,672,908 | B2 | * | 3/2010 | Tomasic et al. | 706/12 |
| 7,890,653 | B2 | * | 2/2011 | Kutsumi et al. | 709/238 |
| 2003/0131023 | A1 | * | 7/2003 | Bassett et al. | 707/200 |
| 2006/0085374 | A1 | * | 4/2006 | Mayes et al. | 707/1 |
| 2009/0276274 | A1 | * | 11/2009 | Sasagawa | 705/8 |

OTHER PUBLICATIONS

W.M.P. van der Aalst and B.F. van Dongen, "Discovering Workflow Performance Models from Timed Logs", Lecture Notes in Computer Science, vol. 2480, Jan. 2002, pp. 107-110.
Extended Supplementary European Search Report in Application No. 06835179.0-1238 dated Jul. 11, 2001.
Patent Abstracts of Japan, Publication No. 08-320899, published Dec. 3, 1996.
Patent Abstracts of Japan, Publication No. 09-245087, published Sep. 19, 1997.

(Continued)

Primary Examiner — Jonathan G Sterrett
Assistant Examiner — Folashade Anderson
(74) Attorney, Agent, or Firm — Staas & Halsey LLP

(57) ABSTRACT

Update history information of databases is analyzed, and workflow models are automatically displayed with typical workflows and exceptional workflows separately represented. An update history information storage unit stores update history information including identification information of a data update process, and the name and updated time of an updated data set. A workflow extractor generates flow information where the names of updated data sets are arranged in chronological order of updated time, oldest first, for every data update process, and counts the number of appearances of flow information of same. Out of the workflows represented by the flow information, the workflow classification unit classifies the workflows into typical and exceptional workflows depending on the number of appearances. A workflow model display unit displays a typical workflow diagram showing the typical workflows, and in response to user input, displays an exceptional workflow diagram showing the typical and exceptional workflows.

15 Claims, 32 Drawing Sheets

(56) References Cited

OTHER PUBLICATIONS

Patent Abstracts of Japan, Publication No. 11-085877, published Mar. 30, 1999.
Patent Abstracts of Japan, Publication No. 2001-175678, published Jun. 29, 2001.
Patent Abstracts of Japan, Publication No. 2005-032073, published Feb. 3, 2005.
Kato et al., "Gyomu no Kashika o Okonau BPM Kiban no Shisaku (A Prototype of Business Process Management Infrastructure)", Information Processing Society of Japan Technical Report, vol. 2004, No. 87, Information Processing Society of Japan, ISSN 0919-6072, pp. 37-44.

Take et al., "System Kado Jokyo no Bunseki Kashika Gijutsu (IT System Behavior Analysis and Visualization Technology)", Fujitsu, vol. 56, No. 5, Fujitsu Ltd., ISSN 0016-2515, pp. 447-451.
van der Aalst et al., Workflow Mining: a Survey of Issues and Approaches, Data and Knowledge Engineering, vol. 47, No. 2, pp. 237-267.
van der Aalst et al., Workflow Mining: Discovering Process Models from Event Logs, IEEE Transactions on Knowledge and Data Engineering (TDKE), vol. 16, No. 9, pp. 1128-1142.
van Leeuwen, "Computer Kiso Riron Handbook I Algorithm to Fukuzatsusa (Algorithms and Complexity)", Maruzen Co., Ltd., pp. 296-299.

* cited by examiner

110a

| UPDATE HISTORY INFORMATION TABLE | | |
|---|---|---|
| PROCESS ID | TABLE NAME | UPDATED TIME |
| 0001 | request_info | 2006/04/01 12:10:09 |
| 0001 | btrip_cntl | 2006/04/01 12:10:21 |
| 0002 | request_info | 2006/04/01 13:01:50 |
| 0002 | request_info_update | 2006/04/01 13:02:10 |
| ⋮ | ⋮ | ⋮ |

| UPDATE HISTORY INFORMATION TABLE | | | | 410a |
|---|---|---|---|---|
| PROCESS ID | TABLE NAME | UPDATED TIME | ATTRIBUTE VALUE | |
| 0001 | request_info | 2006/04/01 12:10:09 | req=1011 | |
| 0001 | btrip_cntl | 2006/04/01 12:10:21 | amount=1000 | |
| 0002 | request_info | 2006/04/01 13:01:50 | req=1012 | |
| 0002 | request_info_update | 2006/04/01 13:02:10 | ver1=20, ver2=12 | |
| ⋮ | ⋮ | ⋮ | ⋮ | |
| 411 | 412 | 413 | 414 | |

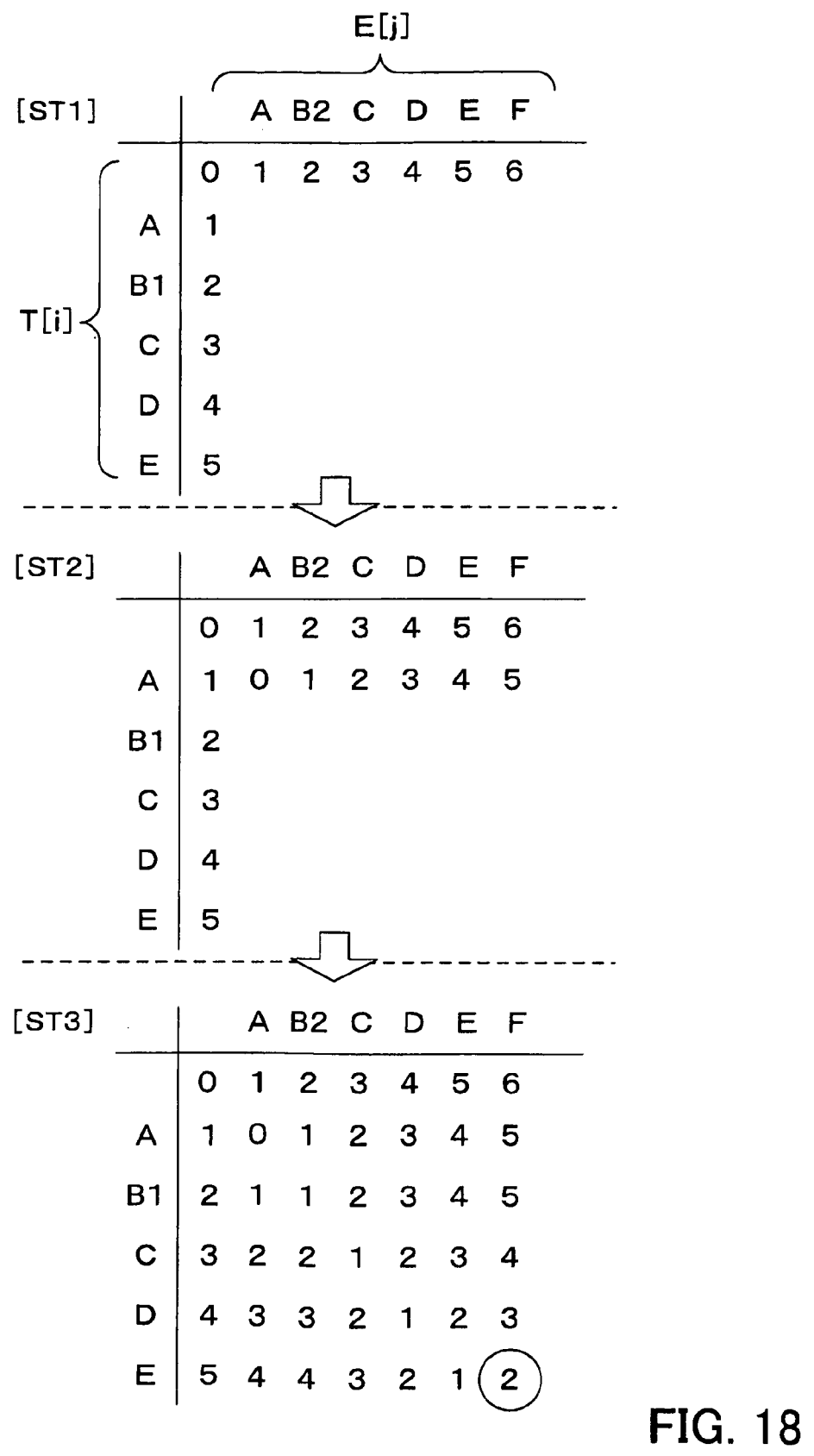

|   | | A | B2 | C | D | E | F |
|---|---|---|----|---|---|---|---|
|   |   | 0 | 1  | 2 | 3 | 4 | 5 | 6 |
| T[i] | A | 1 | | | | | |
|   | B1 | 2 | | | | | |
|   | C | 3 | | | | | |
|   | D | 4 | | | | | |
|   | E | 5 | | | | | |

[ST2]

|   | A | B2 | C | D | E | F |
|---|---|----|---|---|---|---|
|   | 0 | 1 | 2 | 3 | 4 | 5 | 6 |
| A | 1 | 0 | 1 | 2 | 3 | 4 | 5 |
| B1 | 2 | | | | | | |
| C | 3 | | | | | | |
| D | 4 | | | | | | |
| E | 5 | | | | | | |

[ST3]

|   | A | B2 | C | D | E | F |
|---|---|----|---|---|---|---|
|   | 0 | 1 | 2 | 3 | 4 | 5 | 6 |
| A | 1 | 0 | 1 | 2 | 3 | 4 | 5 |
| B1 | 2 | 1 | 1 | 2 | 3 | 4 | 5 |
| C | 3 | 2 | 2 | 1 | 2 | 3 | 4 |
| D | 4 | 3 | 3 | 2 | 1 | 2 | 3 |
| E | 5 | 4 | 4 | 3 | 2 | 1 | ②|

FIG. 18

[ST11]
EXCEPTIONAL WORKFLOW      A→B→C→D→B→C→E→C→D
REGULAR TABLE SEQUENCE    Ⓐ                    COUNTER: 0

---

[ST12]
EXCEPTIONAL WORKFLOW      A→B→C→D→B→C→E→C→D
REGULAR TABLE SEQUENCE    A→Ⓑ                  COUNTER: 0

---

[ST13]
EXCEPTIONAL WORKFLOW      A→B→C→D→B→C→E→C→D
REGULAR TABLE SEQUENCE    A→B→Ⓒ                COUNTER: 0

---

[ST14]
EXCEPTIONAL WORKFLOW      A→B→C→D→B→C→E→C→D
REGULAR TABLE SEQUENCE    A→B→C→Ⓓ              COUNTER: 0

---

[ST15]
EXCEPTIONAL WORKFLOW      A→B→C→D→B→C→E→C→D
REGULAR TABLE SEQUENCE    A→Ⓑ→C→D              COUNTER: 1

---

[ST16]
EXCEPTIONAL WORKFLOW      A→B→C→D→B→C→E→C→D
REGULAR TABLE SEQUENCE    A→B→Ⓒ→D              COUNTER: 1

---

[ST17]
EXCEPTIONAL WORKFLOW      A→B→C→D→B→C→E→C→D
REGULAR TABLE SEQUENCE    A→B→C→D→Ⓔ            COUNTER: 1

---

[ST18]
EXCEPTIONAL WORKFLOW      A→B→C→D→B→C→E→C→D
REGULAR TABLE SEQUENCE    A→B→Ⓒ→D→E            COUNTER: 2

---

[ST19]
EXCEPTIONAL WORKFLOW      A→B→C→D→B→C→E→C→D
REGULAR TABLE SEQUENCE    A→B→C→Ⓓ→E            COUNTER: 2

FIG. 29

PROGRAM, METHOD AND APPARATUS FOR MODELING WORKFLOW

This application is a continuing application, filed under 35 U.S.C. §111(a), of International Application PCT/JP2006/325809, filed Dec. 25, 2006, it being further noted that priority is based upon Japanese Patent Application No. 2006-136518, filed May 16, 2006.

BACKGROUND OF THE INVENTION

1. Field of the Invention

This invention relates to a program, method and apparatus for modeling workflows each representing a flow of work, and more particularly to a program, method, and apparatus for automatically modeling workflows based on the operational state of computer systems.

2. Description of the Related Art

Recent years, as more data is processed by using computers, more business activities require computer systems. For example, an enterprise that sells commodities to customers uses computer systems for management of customer information, inventory management, order management, etc. As flows of work (hereinafter, referred to as workflows) using computer systems are complicated, workflow models are configured to clearly show workflows. The workflow models are ones that abstractly describe workflows for easy understanding, so that business managers and system administrators can intuitively confirm the workflows. In many cases, such workflow models are configured as part of design information when a computer system is to be installed.

By the way, workflow models configured when a computer system is installed need to be re-configured later where appropriate because workflows vary with time in many cases. Therefore, a system administrator needs to grasp the current workflows in order to determine whether the computer system is suitable for the current business activities. In addition, a business manager needs to grasp the current workflows in order to review the business activities or consider the reconstruction of the computer system. However, workflow modeling requires a lot of efforts. In general, the workflows are modeled by the system administer asking workers about their work activities by means of questionnaire or discussions. Therefore, it may be impossible to model workflows in a short time.

Recent years, attentions are paid to a technique of automatically modeling workflows by analyzing the actual operational state of computer systems. One of such techniques is that information such as the updated contents of data and the operational inputs of workers is acquired and analyzed to detect an order relation among a series of processes in computer systems, and then workflow models are configured (for example, refer to W. M. P van der Aalst and five more, "Workflow Mining: A Survey of Issues and Approaches", [online], [searched on Nov. 8, 2006], the Internet <URL: http://is.tm-.tue.nl/research/processmining/papers/wf-min-surv.pdf>). This can greatly reduce a time required for modeling workflows.

However, the technique taught in the document "Workflow Mining: A Survey of Issues and Approaches" has a drawback that this technique is presented for providing typical workflows that frequently occur and does not deal with exceptional workflows that occur less frequently.

More specifically, this technique eliminates flows that occur less frequently, as noise from flows each connecting two successive processes. This prevents configured workflow models from becoming too complicated and user-unfriendly.

However, such exceptional workflows may be useful information for reviewing business activities and considering the reconstruction of computer systems. For example, if there is a workflow which occurs less frequently but is undesirable for operating the computer systems, the computer systems may need to be re-designed so that this workflow does not occur. This means that such exceptional workflows need to be grasped where appropriate.

SUMMARY OF THE INVENTION

This invention is made in view of the foregoing and intends to provide a program, method, and apparatus for automatically modeling workflows based on update history information of representative databases which is information on the operational state of computer systems, and separately showing typical workflows and exceptional workflows.

To achieve the object, there is provided a computer-readable medium having stored thereon a workflow modeling program for automatically modeling a workflow representing a flow of work based on an operational state of computer systems. This workflow modeling program causes a computer to perform as: an update history information storage unit storing process identification information uniquely identifying a data update process, a data set name of a data set updated in the data update processes, and an updated time of the data set in association with each other, the data update process including update of a plurality of data sets; a workflow extractor for consulting the update history information storage unit to generate flow information in which data set names of the plurality of data sets updated in the data update process are arranged in chronological order of updated time, oldest first, for every data update process, and counting a number of appearances of flow information of same in all of the generated flow information; a workflow classification unit for arranging workflows represented by the flow information generated by the workflow extractor in decreasing order of the number of appearances, sequentially selecting the workflows in decreasing order of the number of appearances until an accumulated number of appearances reaches a preset threshold, and classifying the selected workflows as typical workflows and unselected workflows as exceptional workflows; and a workflow model display unit for displaying a typical workflow diagram with each of the data set names as a node based on information on all of the typical workflows determined by the workflow classification unit, and in response to user input, displaying an exceptional workflow diagram with each of the data set names as a node based on information on the exceptional workflows determined by the workflow classification unit and the information on all of the typical workflows.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view showing an example data structure of an update history information table according to the first embodiment.

FIG. 12 is a view showing an example data structure of an update history information table according to the second embodiment.

FIG. 18 is a conceptual diagram showing a flow of the distance calculation process.

FIG. 29 is a conceptual diagram showing a flow of the fifth sorting process.

DESCRIPTION OF THE PREFERRED EMBODIMENTS

Preferred embodiments of this invention will be described with reference to the accompanying drawings. First the overview of the invention and then the specific embodiments will be described.

Figure 1:
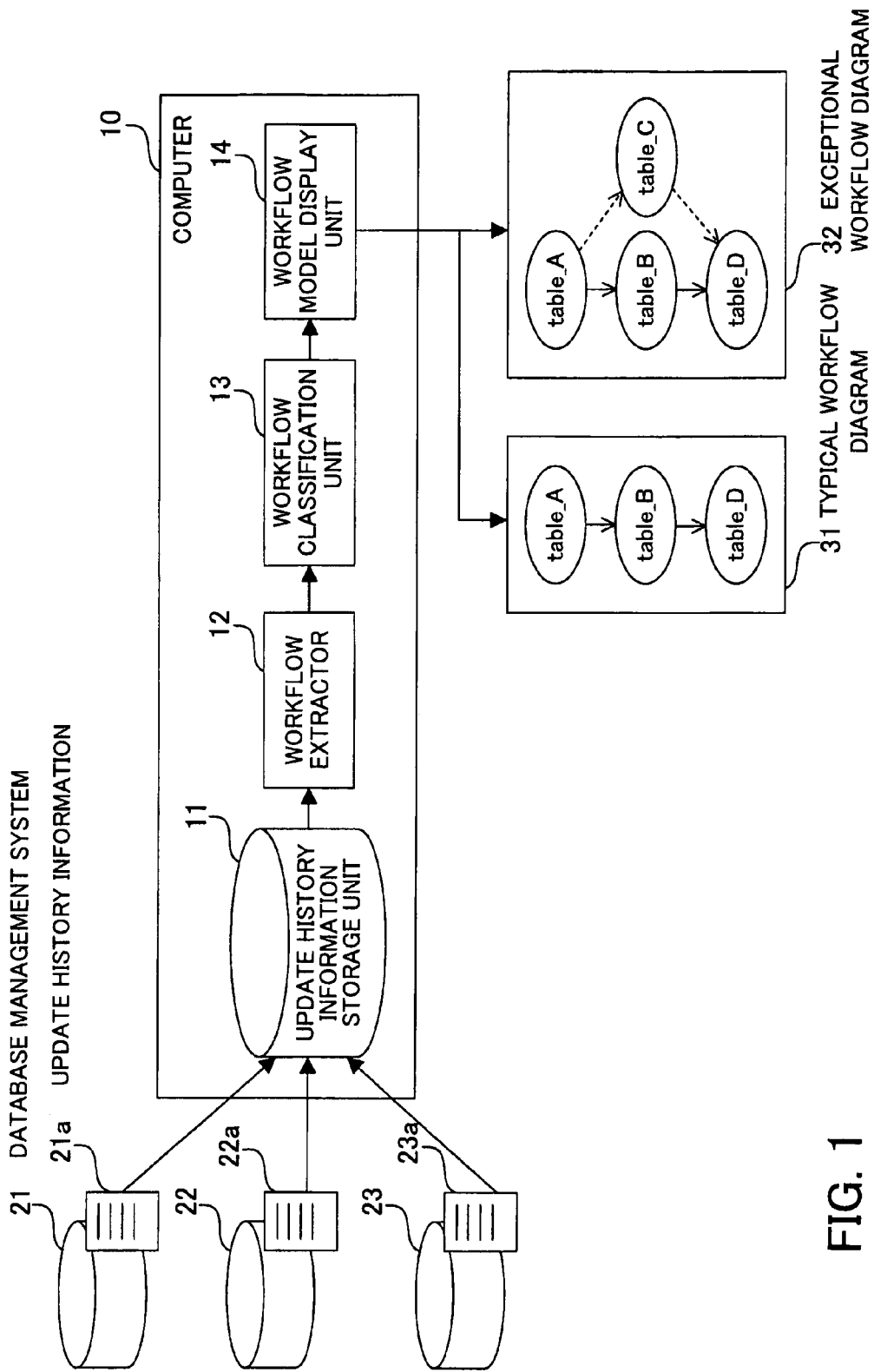
FIG. 1 is a view showing the overview of one embodiment.

FIG. 1 shows an overview of one embodiment. A computer 10 shown in FIG. 1 is designed to configure workflow models such as a typical workflow diagram and an exceptional workflow diagram based on the update history information of databases output from database management systems. The computer 10 has an update history information storage unit 11, a workflow extractor 12, a workflow classification unit 13, and a workflow model display unit 14.

The update history information storage unit 11 stores the update history information 21a, 22a, and 23a of databases received from the database management systems 21, 22, and 23. Each of the update history information 21a, 22a, and 23a includes identification information uniquely identifying a data update process executed in a computer system, the data set name of a data set updated in the data update process, and an updated time of the data set. With one-time data update process, one or more data sets are updated. The identification information of a data update process may be a transaction ID, for example. A data set may be one table in a relational database system, for example.

The workflow extractor 12 extracts workflows by analyzing the update history information stored in the update history information storage unit 11. More specifically, for every data update process, the workflow extractor 12 generates flow information in which the data set names of data sets updated in the data update process are arranged in chronological order of updated time, oldest first. Then, the workflow extractor 12 counts the number of appearances of flow information of same in all of the generated flow information. A sequence of the data set names is considered to represent a workflow.

The workflow classification unit 13 arranges the workflows represented by the flow information generated by the workflow extractor 12 in decreasing order of the number of appearances. Then, the workflow classification unit 13 sequentially selects the workflows in decreasing order, starting with the one having the greatest number of appearances, until an accumulated number of appearances reaches a preset threshold. The threshold may be a fixed integral number indicating an accumulated number of appearances, or a value indicating a ratio to a total number of appearances, for example. Then the workflow classification unit 13 classifies the selected workflows as typical workflows and the unselected workflows as exceptional workflows.

The workflow model display unit 14 displays a typical workflow diagram 31 with each data set name as a node based on the information on all of the typical workflows determined by the workflow classification unit 13. Further, in response to user input, the workflow model display unit 14 displays an exceptional workflow diagram 32 with each data set name as a node based on the information on all of the typical workflows and the information on the exceptional workflows. The exceptional workflow diagram 32 shows a user-specified exceptional workflow, for example.

With such the computer 10, the workflow extractor 12 generates flow information representing an order of updating data sets for every data update process, and counts the number of appearances of flow information of same. Then, the workflow classification unit 13 classifies the workflows represented by the flow information into typical workflows and exceptional workflows depending on the number of appearances of flow information. The workflow model display unit 14 displays the typical workflow diagram 31 showing all of the typical workflows, and in response to user input, displays the exceptional workflow diagram 32 showing all of the typical workflows and exceptional workflows.

As a result, the displayed typical workflow diagram allows business managers and system administrators to intuitively confirm the entire workflows. On the other hand, the exceptional workflow diagram allows the business managers and the system administrators to easily know how the exceptional workflows are involved in the entire workflows. Thus, the business managers and the system administrators can obtain useful workflow models in a short time, according to necessity, to review the business activities or consider the reconstruction of computer systems.

First Embodiment

Hereinafter, the first embodiment will be described with reference to accompanying drawings.

Figure 2:
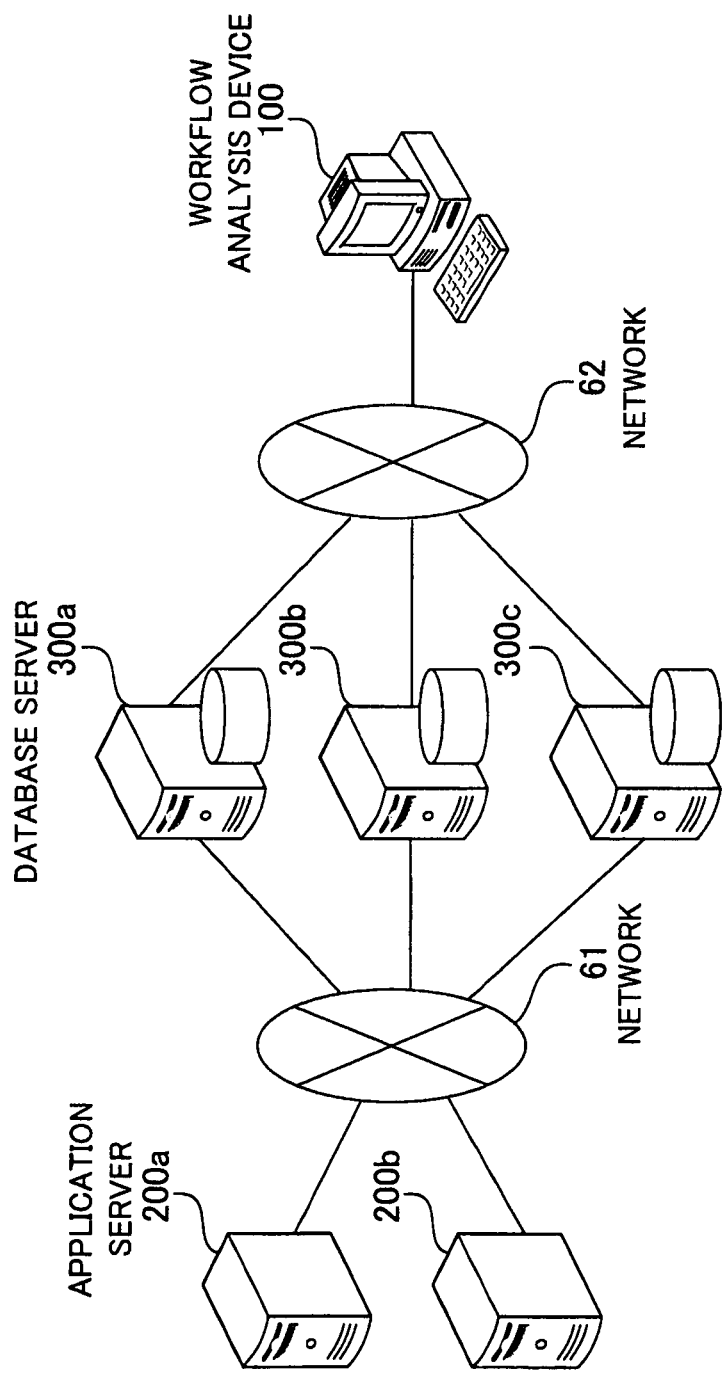
FIG. 2 is a view showing a system configuration according to the embodiment.

FIG. 2 shows a system configuration according to the embodiment. A workflow analysis system according to the first embodiment is designed to analyze the update history information of databases received from database management systems and automatically model workflows.

The workflow analysis system according to this embodiment includes a workflow analysis device 100, application servers 200a and 200b, database servers 300a, 300b, and 300c, and networks 61 and 62. The application servers 200a and 200b and the database servers 300a, 300b, and 300c are connected to each other via the network 61. The workflow analysis device 100 and the database servers 300a, 300b, and 300c are connected to each other via the network 62.

The application servers 200a and 200b execute application programs. For example, the application server 200a executes an inventory management program while the application server 200b executes an order management program. The application programs running on the application servers 200a and 200b access the database servers 300a, 300b, and 300c via the network 61 to use data managed by the database servers 300a, 300b, and 300c according to necessity.

Each database server 300a, 300b, 300c executes a database management system. The database management system manages data to be used by the application programs of the application servers 200a and 200b. The database management system manages data in tabular form, and searches for and updates data in response to requests from the application programs. When a data update process is performed, the database management system outputs update history information to a log file. The log file is managed by a corresponding database server 300a, 300b, 300c.

The workflow analysis device 100 acquires the log files from the database servers 300a, 300b, and 300c via the network 62. Then the workflow analysis device 100 automatically models workflows by analyzing the update history information contained in the acquired log files.

In this embodiment, the workflow analysis device 100 is provided as a device for realizing a function of modeling workflows. However, this function of the workflow analysis device 100 can be realized on any one of the database servers 300a, 300b, and 300c or alternatively, on either one of the application servers 200a and 200b.

Now, the hardware configuration of the workflow analysis device 100, the application servers 200a and 200b, and the database servers 300a, 300b, and 300c will be described. In this connection, as the workflow analysis device 100, the application servers 200a and 200b, and the database servers 300a, 300b, and 300c have the same hardware configuration, the hardware configuration of the workflow analysis device 100 will be described by way of example.

Figure 3:
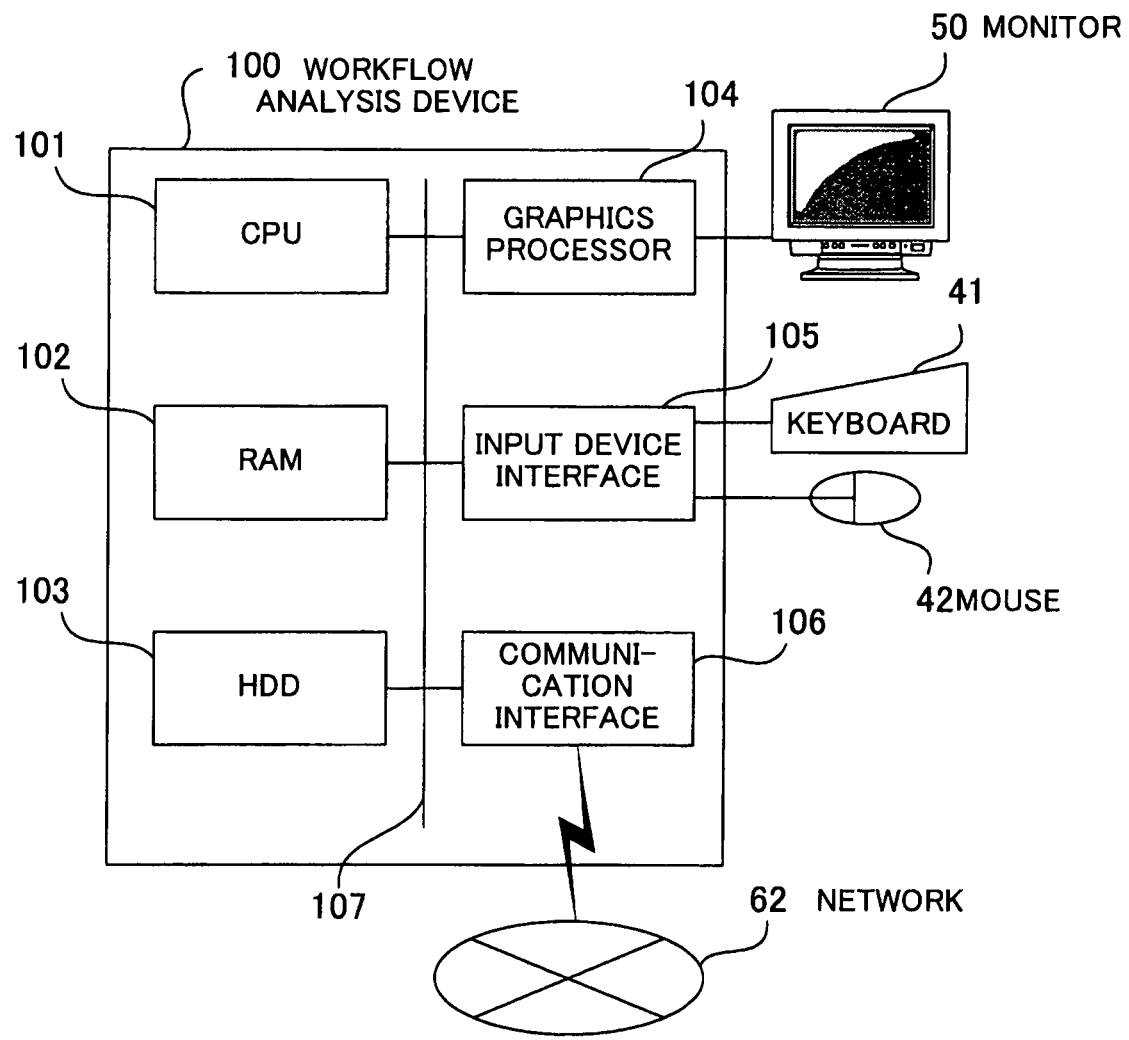
FIG. 3 is a view showing the hardware configuration of a workflow analysis device.

FIG. 3 shows the hardware configuration of the workflow analysis device. The workflow analysis device 100 is entirely controlled by a CPU (Central Processing Unit) 101. Connected to the CPU 101 via a bus 107 are a RAM (Random Access Memory) 102, a Hard Disk Drive (HDD) 103, a graphics processor 104, an input device interface 105, and a communication interface 106.

The RAM 102 temporarily stores at least part of an OS program and application programs to be executed by the CPU 101. The RAM 102 also stores various data for CPU processing. The HDD 103 stores the OS program and the application programs.

The graphics processor 104 is connected to a monitor 50 and is designed to display images on the monitor 50 under the control of the CPU 101. The input device interface 105 is connected to a keyboard 41 and a mouse 42 and is designed to transfer signals from the keyboard 41 and the mouse 42 to the CPU 101 via the bus 107. The communication interface 106 is connected to the network 62.

Such a hardware configuration realizes the processing functions of this embodiment.

Now the module configuration of the workflow analysis device 100 will be described.

Figure 4:
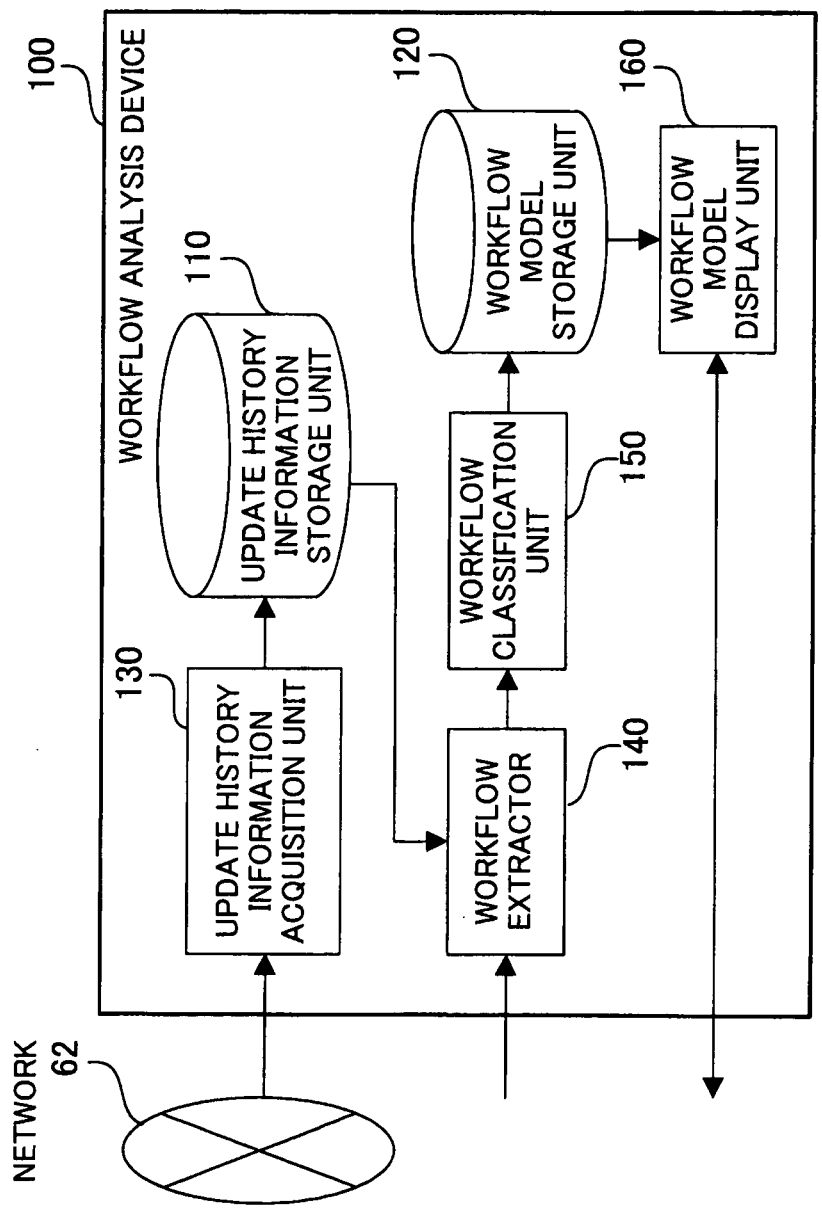
FIG. 4 is a functional block diagram of a workflow analysis device according to the first embodiment.

FIG. 4 is a functional block diagram of the workflow analysis device according to the first embodiment. The workflow analysis device 100 has an update history information storage unit 110, a workflow model storage unit 120, an update history information acquisition unit 130, a workflow extractor 140, a workflow classification unit 150, and a workflow model display unit 160. The update history information acquisition unit 130 is capable of communicating with the database servers 300a, 300b, and 300c via the network 62. The workflow extractor 140 and the workflow model display unit 160 are capable of receiving user inputs via the keyboard 41 and the mouse 42. The workflow model display unit 160 is capable of displaying processing results on the monitor 50.

The update history information storage unit 110 stores update history information received from the database management systems. The update history information is produced every time one table is updated. In this connection, the table update processes include addition, update, and deletion of records. One or more tables are updated by one-time data update process executed by an application program. The update history information includes identification information uniquely identifying a data update process, the table name of an updated table, and an updated time.

The workflow model storage unit 120 stores workflow models configured by the workflow analysis device 100. A workflow model is a set of information representing workflows. A workflow represents an order in which tables were updated in a data update process. For example, a table sequence: "table A", "table B", and "table C" is a workflow. In computer systems used in businesses, an order of updating data is considered to most represent a workflow.

The workflow model storage unit 120 separately stores information on typical workflows and information on exceptional workflows. The typical workflows are the ones that frequently occur while the exceptional workflows are the ones that occur less frequently.

The update history information acquisition unit 130 periodically accesses the database servers 300a, 300b, and 300c at preset intervals to acquire the log files managed by the database servers 300a, 300b, and 300c. Then, the update history information storage unit 110 judges whether each acquired log file includes new update history information which was not stored in the previous log file. This judgment is made by comparing a time of acquiring the previous log file and the updated time included in the new update history information. When new update history information is detected, the update history information acquisition unit 130 extracts the update history information from the log file and adds it to the update history information storage unit 110.

When receiving an instruction of modeling workflows via user input, the workflow extractor 140 analyzes the update history information stored in the update history information storage unit 110 to extract workflows. More specifically, the workflow extractor 140 classifies the update history information by data update process, and for every data update process, defines a table sequence in which the table names of tables are arranged in chronological order of updated time, oldest first. This table sequence is used as information that represents a workflow. Further, the workflow extractor 140 counts the number of appearances of workflow of same.

The instruction of modeling workflows may include information of a user-defined classification ratio. The classification ratio is a ratio of an accumulated number of appearances of typical workflows to a total number of appearances of workflows. The classification ratio is represented by a numerical value such as "0.6" (60%), for example.

The workflow classification unit 150 arranges the workflows extracted by the workflow extractor 140 in decreasing order of the number of appearances. Then, the workflow classification unit 150 sequentially selects workflows in order, starting with the one having the greatest number of appearances, until an accumulated number of appearances reaches the classification ratio. In this connection, if the user has defined the classification ratio, this user-defined classification ratio is used. If the user has not defined the classification ratio, a preset classification ratio is used. The workflow classification unit 150 classifies the selected workflows as typical workflows and the unselected workflows as exceptional workflows. Then the workflow classification unit 150 stores the information on the typical workflows and the information on the exceptional workflows in the workflow model storage unit 120.

When the information stored in the workflow model storage unit 120 is updated, the workflow model display unit 160 retrieves the information on all of the typical workflows from the workflow model storage unit 120, and displays a typical workflow diagram. The typical workflow diagram is a diagram which shows all of the typical workflows. The typical workflow diagram has one initial node, one final node, and nodes corresponding to table names.

In addition, the workflow model display unit 160 displays a list of information indicative of the exceptional workflows based on the information on the exceptional workflows stored in the workflow model storage unit 120. In this connection, when the user selects one exceptional workflow, the workflow model display unit 160 retrieves the information on all of the typical workflows and the information on the selected exceptional workflow from the workflow model storage unit 120, and displays an exceptional workflow diagram. The exceptional workflow diagram is a diagram which shows the one exceptional workflow in addition to all of the typical workflows. Similarly to the typical workflow diagram, the exceptional workflow diagram has one initial node, one final node, and nodes corresponding to table names.

In this embodiment, the update history information acquisition unit 130 periodically accesses the database servers 300a, 300b, and 300c. However, the update history information acquisition unit 130 may be designed to access the database servers 300a, 300b, and 300c when receiving an instruction of modeling workflows from the user.

The update history information storage unit 110 has an update history information table 110a containing a list of update history information.

FIG. 5 shows an example data structure of the update history information table according to the first embodiment. The update history information table 110a contains update history information on every table update process in tabular form. The update history information table 110a has fields for process ID 111, table name 112, and updated time 113. Information in fields arranged in a row is associated with each other and composes update history information.

The field 111 contains an identification number uniquely identifying a data update process. As a process ID, a transaction ID may be used, for example. In this case, the database management systems executed on the database servers 300a, 300b, and 300c cooperate with each other to give a unique transaction ID to each data update process and include the transaction ID in update history information. Alternatively, the application programs executed on the application servers 200a and 200b may be designed to set a unique identification number for each data update process, and the database management systems may include the identification number in the update history information.

The field 112 contains the table name of a table updated in the data update process identified by the process ID set in the field 111. The field 113 contains an updated time when the table of the table name set in the field 112 was updated in the data update process identified by the process ID set in the field 111.

The update history information contained in the update history information table 110a is recorded by the update history information acquisition unit 130. For example, information including a process ID of "0001", a table name of "request_info", and an updated time of "2006/04/01 12:10:09" is registered.

The workflow model storage unit 120 has a typical workflow information table 120a containing a list of typical workflow information and an exceptional workflow information table 120b containing a list of exceptional workflow information.

Figure 6:
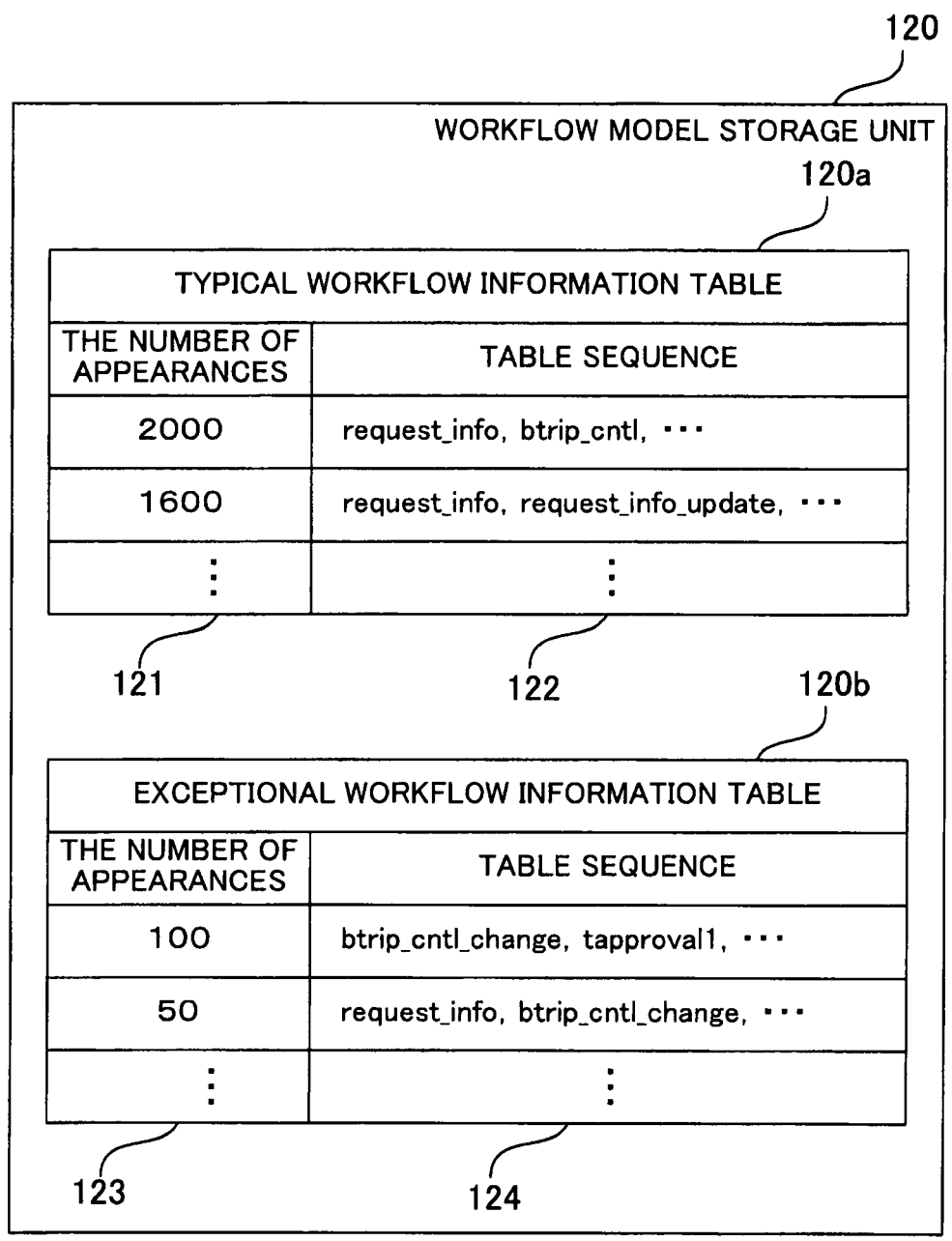
FIG. 6 is a view showing example data structures of a typical workflow information table and an exceptional workflow information table according to the first embodiment.

FIG. 6 shows example data structures of the typical workflow information table and the exceptional workflow information table according to the first embodiment. The typical workflow information table 120a contains information on each workflow classified as a typical workflow in tabular form. The typical workflow information table 120a has fields for the number of appearances 121 and table sequence 122. Information in fields arranged in a row is associated with each other and composes typical workflow information.

The field 121 contains an integral number representing the number of appearances of a typical workflow. That is, this field 12 shows how many times a typical workflow indicating a data update process has been executed. The field 122 contains a sequence of table names representing a typical workflow. The leftmost table name represents a table which was updated first and the rightmost table name represents a table which was updated last. A comma is used between table names.

The typical workflow information contained in the typical workflow information table 120a is registered by the workflow classification unit 150. For example, information having the number of appearances of "2000" and a table sequence of "request_info, btrip_cntl, . . . (the rest is omitted)" are registered.

The exceptional workflow information table 120b contains information on each workflow classified as an exceptional workflow in tabular form. The exceptional workflow information table 120b has fields for the number of appearances 123 and table sequence 124. Information in fields arranged in a row is associated with each other and composes exceptional workflow information.

The field 123 contains an integral number indicating the number of appearances of an exceptional workflow. That is, this field 123 shows how many times an exceptional workflow indicating a data update process has been executed. The field 124 contains a sequence of table names representing an exceptional workflow. The leftmost table name indicates a table that was updated first and the rightmost table name indicates a table that was updated last. A comma is used between table names.

The exceptional workflow information contained in the exceptional workflow information table 120b is registered by the workflow classification unit 150. For example, information having the number of appearances of "100" and a table sequence of "btrip_cntl_change, tapproval1, . . . (the rest is omitted)" are registered.

Now, the system having the above configuration and the data structures will be described in detail. First a process of analyzing update history information and extracting workflows will be described.

Figure 7:
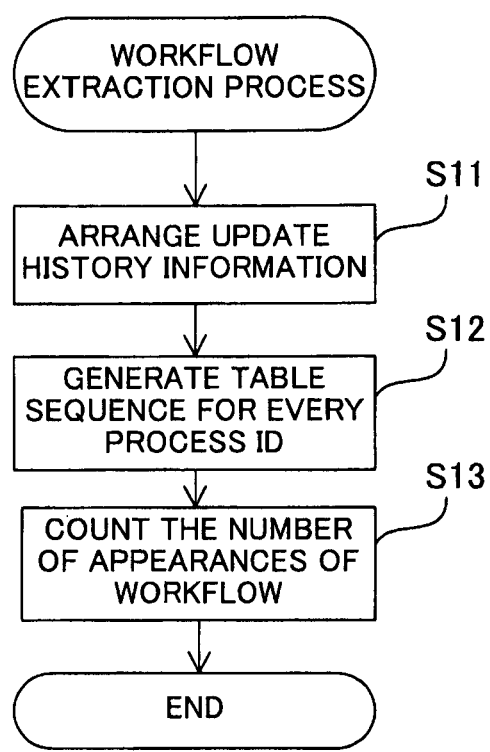
FIG. 7 is a flowchart showing a procedure of a workflow extraction process.

FIG. 7 is a flowchart showing a procedure of a workflow extraction process. This process shown in FIG. 7 will be described step by step.

[Step S11] When receiving an instruction of modeling workflows, the workflow extractor 140 arranges all update history information stored in the update history information storage unit 110, by process ID.

[Step S12] The workflow extractor 140 further arranges a plurality of update history information with the same process ID in chronological order of updated time, oldest first. Then the workflow extractor 140 generates a table sequence for every process ID, in which the table names are arranged in chronological order of updated time, oldest first.

[Step S13] The workflow extractor 140 aggregates all the table sequences generated at step S12. That is, the number of same table sequences is counted. This counted number indicates the number of appearances of a workflow represented by the table sequence. Then the workflow extractor 140 notifies the workflow classification unit 150 of the counting result. If the instruction of modeling workflows includes a user-defined classification ratio, the workflow extractor 140 notifies the workflow classification unit 150 of the user-defined classification ratio as well.

In this way, the workflow extractor 140 uses the update history information stored in the update history information storage unit 110 to generate a table sequence for every data update process. Then the workflow extractor 140 aggregates all of the generated table sequences and specifies each workflow and the number of appearances of the workflow.

Now a process of classifying workflows into typical workflows and exceptional workflows will be described.

Figure 8:
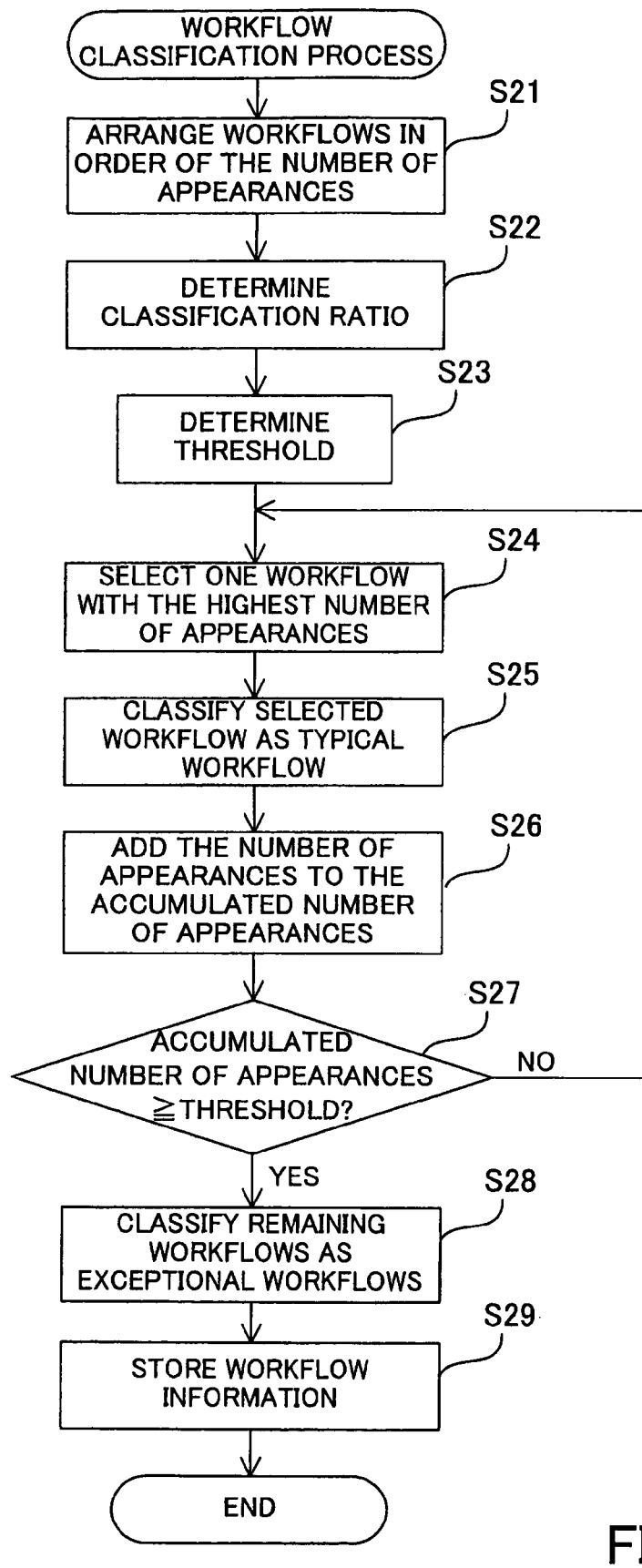
FIG. 8 is a flowchart showing a procedure of a workflow classification process.

FIG. 8 is a flowchart showing a procedure of a workflow classification process. This process shown in FIG. 8 will be described step by step.

[Step S21] The workflow classification unit 150 arranges the information on workflows received from the workflow extractor 140 in decreasing order of the number of appearances.

[Step S22] If receiving a user-defined classification ratio from the workflow extractor 140, the workflow classification unit 150 sets the user-defined classification ratio as a classification ratio. If not receiving the user-defined classification ratio from the workflow extractor 140, the workflow classification unit 150 sets a preset value as the classification ratio.

[Step S23] The workflow classification unit 150 counts a total number of appearances of workflows arranged in step S21. Then the workflow classification unit 150 calculates a product of the total number of appearances and the classification ratio set in step S22, as a threshold.

[Step S24] The workflow classification unit 150 selects one workflow which has not been classified and has the greatest number of appearances from the workflows arranged in step S21.

[Step S25] The workflow classification unit 150 specifies the workflow selected in step S24 as a typical workflow.

[Step S26] The workflow classification unit 150 calculates an accumulated number of appearances of workflows classified as typical workflows.

[Step S27] The workflow classification unit 150 determines whether the accumulated number of appearances is equal to or greater than the threshold. If the accumulated number of appearances is equal to or greater than the threshold, the process goes on to step S28. If the accumulated number of appearances is lower than the threshold, the process goes back to step S24.

[Step S28] The workflow classification unit 150 classifies workflows which have not been specified as typical workflows, as exceptional workflows out of the workflows arranged in step S21.

[Step S29] The workflow classification unit 150 deletes all registered information from the typical workflow information table 120a and exceptional workflow information table 120b stored in the workflow model storage unit 120. Then the workflow classification unit 150 registers the table sequence and the number of appearances of each workflow classified as a typical workflow in step S25, in the typical workflow information table 120a as typical workflow information. In addition, the workflow classification unit 150 registers the table sequence and the number of appearances of each workflow classified as an exceptional workflow in step S28, in the exceptional workflow information table 120b as exceptional workflow information.

As described above, the workflow classification unit 150 determines a threshold for an accumulated number of appearances of workflows based on the classification ratio, and classifies the workflows into typical workflows that frequently occur and exceptional workflows that occur less frequently according to the threshold. In this connection, the workflow classification unit 150 uses a user-defined classification ratio as the classification ratio if given the user-defined classification ratio, and uses a preset value as the classification ratio if not given.

Now, the typical workflow diagram and the exceptional workflow diagram to be displayed by the workflow model display unit 160 will be described.

Figure 9:
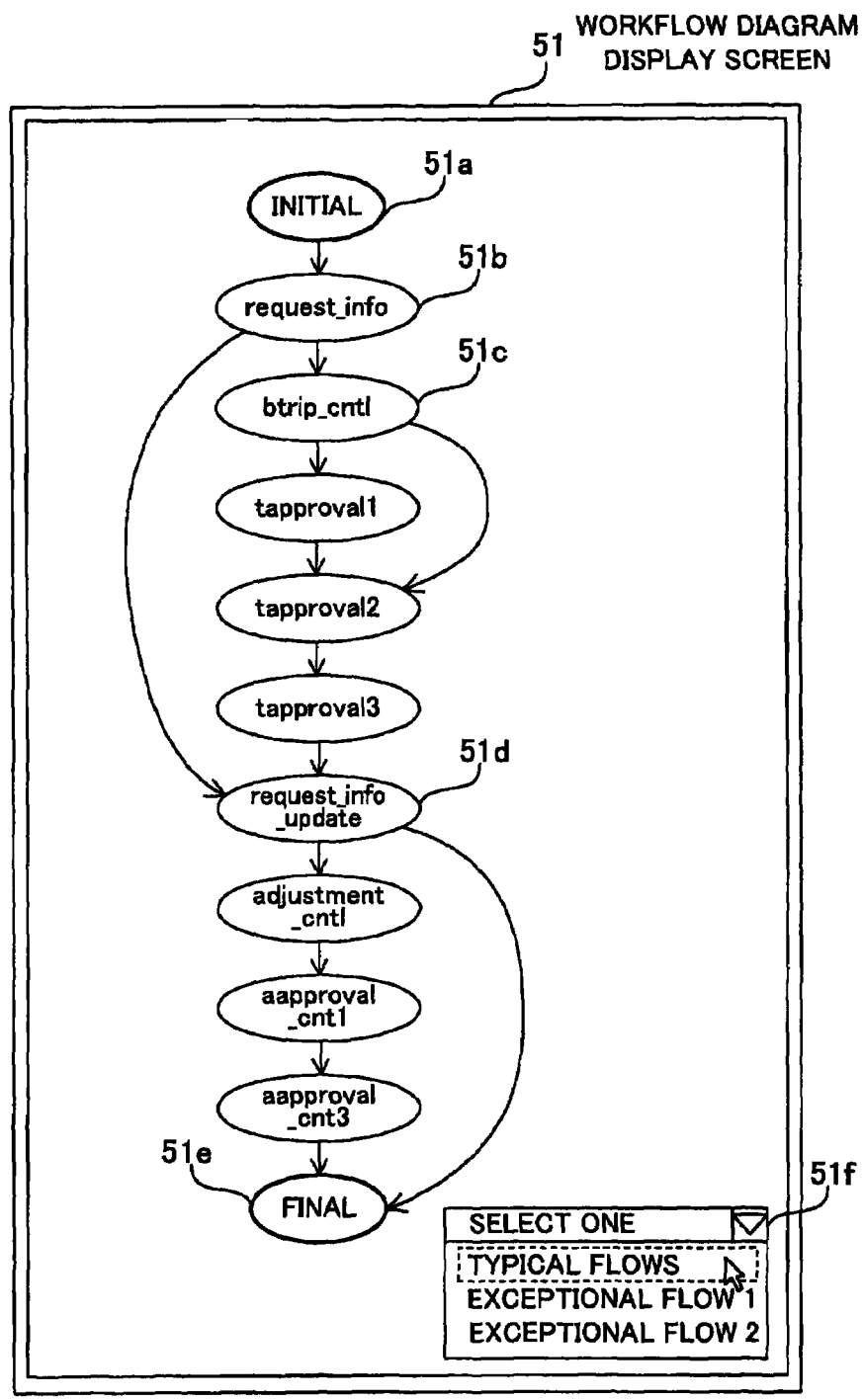
FIG. 9 is a view showing an example typical workflow diagram.

FIG. 9 shows an example typical workflow diagram. The workflow diagram display screen 51 is a screen that is displayed on the monitor 50 according to outputs of the workflow model display unit 160. The workflow diagram display screen 51 displays one typical workflow diagram showing all typical workflows.

The workflow diagram display screen 51 has one initial node 51a and one final node 51e. The initial node 51a represents the start point of the workflow and the final node 51e represents the end point of the workflow. In addition, a plurality of nodes exists between the initial node 51a and the final node 51e. Each of the nodes excepting the initial node 51a and the final node 51e is given one table name.

The workflow diagram display screen 51 shows a directional line between nodes, the directional line representing an order relation between processes. For example, a directional line from the node 51b to the node 51c means that there is a typical workflow in which an update process for a table "btrip_cntl" is executed after an update process for a table "request_info".

A plurality of directional lines drawn from one node means that any one of the processes pointed by the arrows is executed after the process from which the directional lines are drawn. For example, the directional lines from the node 51b to the node 51c and to the node 51d mean that any one of the update process for the table "btrip_cntl" and the update process for the table "request_info_update" is executed after the update process for the table "request_info".

As described above, with a series of directional lines from the initial node 51a to the final node 51e, the order relations among processes in typical workflows are represented in one diagram. For example, the typical workflow information table 120a shown in FIG. 6 shows a typical workflow represented by a table sequence of "request_info, btrip_cntl, . . . " and the number of appearances of 2000, with directional lines from the initial node 51a via the node 51b, the node 51c, . . . , to the final node 51e. In addition, a typical workflow represented by a table sequence of "request_info, request_info_update, . . . " and the number of appearances of 1600 is displayed with directional lines from the initial node 51a via the node 51b, the node 51d, . . . , to the final node 51e.

The field 51f is a selection field for switching the display of a workflow diagram. When the workflow diagram display screen 51 is displayed on the monitor 50, "typical flows" is being selected. This means that only the typical workflows are displayed on the monitor 50.

The selection field 51f shows element names uniquely given to exceptional workflows as selectable elements, other than "typical flows". As the element name, "exceptional flow 1", "exceptional flow 2", . . . are given to exceptional workflows in order from the one having the greatest number of appearances. For example, in the exceptional workflow information table 120b shown in FIG. 6, "exceptional flow 1" is given to an exceptional workflow represented by a table sequence "btrip_cntl_change, tapproval1, . . . " and the number of appearances of 100, and "exceptional flow 2" is given to an exceptional workflow represented by a table sequence "request_info, btrip_cntl_change, . . . " and the number of appearances of 50.

When the user selects one of "exceptional flow 1", "exceptional flow 2", . . . on the selection field 51f, the display screen is switched and an exceptional workflow diagram showing the selected exceptional workflow in addition to the typical workflows is displayed.

Figure 10:
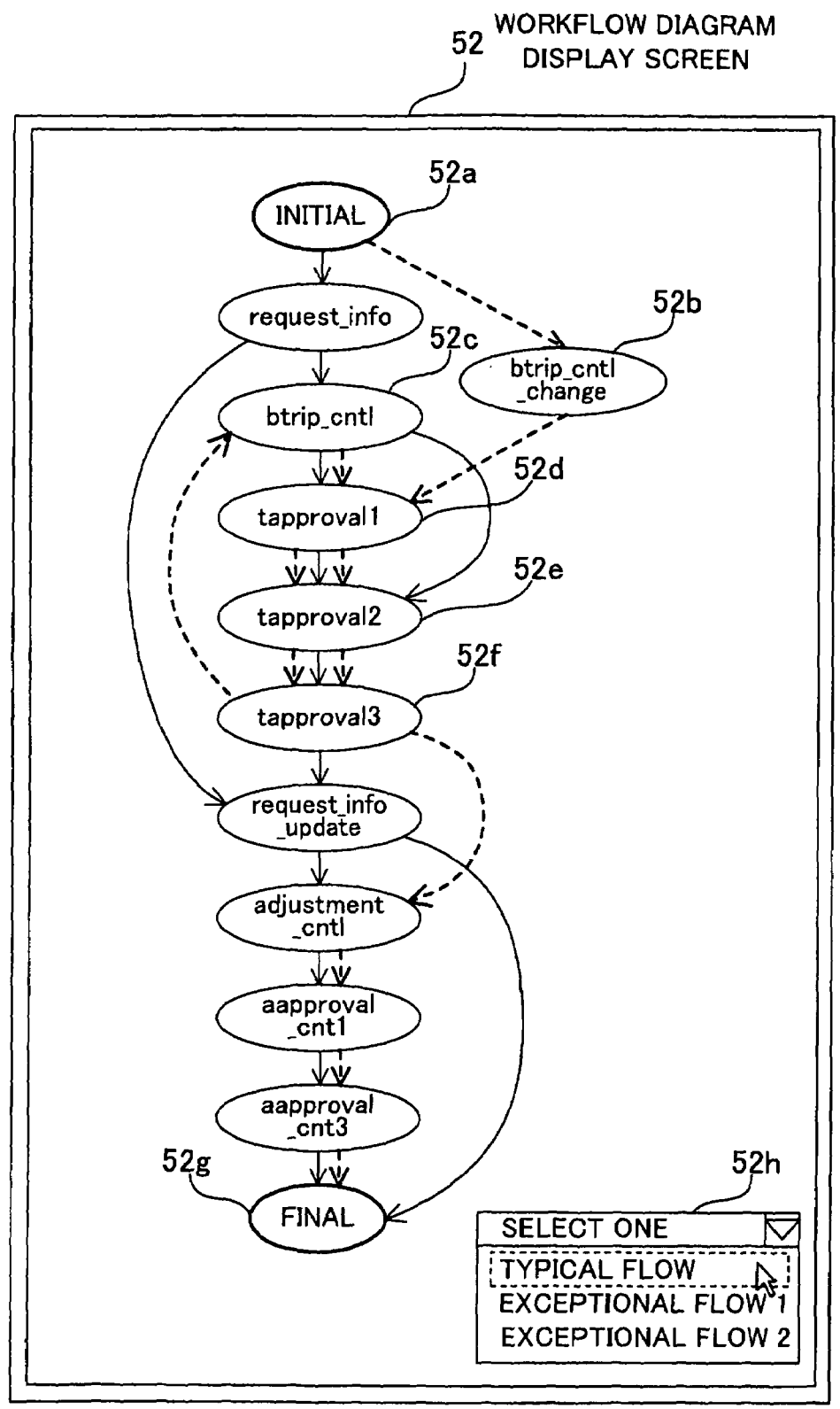
FIG. 10 is a view showing an example exceptional workflow diagram.

FIG. 10 shows an example exceptional workflow diagram. The display screen shown in FIG. 10 is a screen that is displayed on the monitor 50 when "exceptional flow 1" is selected on the selection field 51f of the workflow diagram display screen 51. The workflow diagram display screen 52 displays one exceptional workflow diagram.

The workflow diagram display screen 52 shows all elements displayed in the workflow diagram display screen 51. In addition, the workflow diagram display screen 52 displays nodes representing tables which are not updated in the typical workflows but are updated in the selected exceptional workflow. For example, the node 52b which does not appear in the typical workflow diagram shown in FIG. 9 is displayed.

Further, the workflow diagram display screen 52 shows directional lines representing the selected one exceptional workflow between nodes. The directional lines representing the exceptional workflow are displayed in a different line type from the directional lines representing the typical workflows. For example, the exceptional workflow is represented by a series of directional lines from the initial node 52a via the node 52b, the node 52d, the node 52e, the node 52f, the node 52c, the node 52d, the node 52e, the node 52f, . . . , to the final node 52g.

The selection field 52h is a selection field for switching the display of a workflow diagram, similarly to the selection field 51f of the workflow diagram display screen 51.

In this embodiment, one exceptional workflow is displayed in one exceptional workflow diagram. However, one or more exceptional workflows may be displayed in one exceptional workflow diagram. For this end, the selection fields 51f and 52h may be designed to allow a plurality of elements to be selected.

Such a workflow analysis device 100 is capable of automatically configuring workflow models based on update history information received from the computer systems in operation used in business activities, and displaying typical workflows and exceptional workflows. Especially, the workflow analysis device 100 is capable of displaying exceptional workflows according to necessity without spoiling easy understanding of the configured workflow models.

Therefore, the business managers and the system administrators is able to correctly grasp the current typical workflows and exceptional workflows, and detect problems occurring in the current workflows, so as to review the business activities and consider the reconstruction of the computer systems.

Second Embodiment

Now, the second embodiment will be described in detail with reference to accompanying drawings. Different points from the first embodiment will be mainly described and description for the same points will be omitted.

A workflow analysis system according to the second embodiment is designed to analyze the update history information of databases received from database management systems and automatically model workflows, similarly to the workflow analysis system of the first embodiment. In addition, the workflow analysis system according to the second embodiment is designed to, if the user specifies a sorting method, sort a plurality of exceptional workflows in accordance with the specified sorting method and display list information. Allowing the user to specify the sorting method makes it possible to easily confirm exceptional workflows which fulfill specified conditions, as compared with a case where list information is simply displayed in decreasing order of the number of appearances.

The workflow analysis system according to the second embodiment is realized by the same system configuration as the workflow analysis system of the first embodiment shown in FIG. 2. However, instead of the workflow analysis device 100, a workflow analysis device 400 is connected to the network 62.

Figure 11:
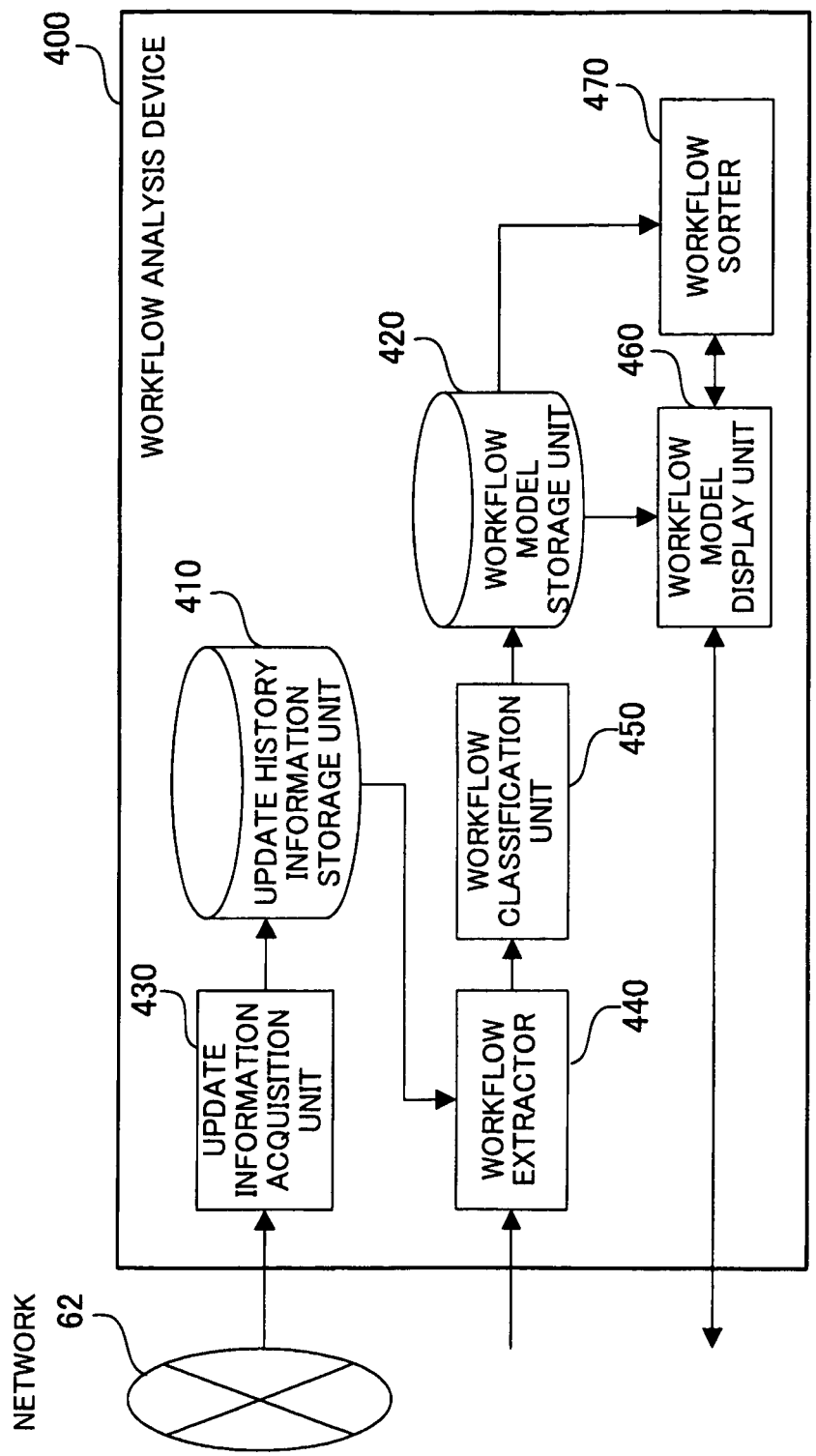
FIG. 11 is a functional block diagram showing a workflow analysis device according to the second embodiment.

FIG. 11 is a functional block diagram of the workflow analysis device according to the second embodiment. The workflow analysis device 400 has an update history information storage unit 410, a workflow model storage unit 420, an update history information acquisition unit 430, a workflow extractor 440, a workflow classification unit 450, a workflow model display unit 460, and a workflow sorter 470.

The update history information acquisition unit 430 is capable of communicating with the database servers 300a, 300b, and 300c via the network 62. The workflow extractor 440 and the workflow model display unit 460 are capable of receiving user inputs via the keyboard 41 and the mouse 42. In addition, the workflow model display unit 460 is capable of displaying processing results on the monitor 50.

The update history information storage unit 410 stores update history information received from the database management systems, similarly to the update history information storage unit 110 of the first embodiment. However, the update history information of the second embodiment includes the updated contents of data, that is, an attribute which was updated in the table and information on an updated attribute value.

The workflow model storage unit 420 stores workflow models which are a collection of typical workflows and exceptional workflows, similarly to the workflow model storage unit 120 of the first embodiment. However, with respect to the exceptional workflows, not only information of a table sequence but also information of a sequence of corresponding updated attribute values is stored.

The update history information acquisition unit 430 acquires log files managed by the database servers 300a, 300b, and 300c, extracts update history information from the log files, and adds them to the update history information storage unit 410, similarly to the update history information acquisition unit 130 of the first embodiment. The update history information extracted from the log files includes the updated contents of data.

The workflow extractor 440 analyzes the update history information stored in the update history information storage unit 410 to extract workflows, similarly to the workflow extractor 140 of the first embodiment. The information on a workflow includes information of a sequence of updated attribute values.

The workflow classification unit 450 classifies workflows into typical workflows and exceptional workflows, and stores information on the workflows in the workflow model storage unit 420, similarly to the workflow classification unit 150 of the first embodiment. The information on the exceptional workflows includes information of a sequence of corresponding updated attribute values.

The workflow model display unit 460 displays a typical workflow diagram based on the information on all of the typical workflows, similarly to the workflow model display unit 160 of the first embodiment. In addition, the workflow model display unit 460 displays a list of information indicative of the exceptional workflows, and when one exceptional workflow is selected via user input, displays an exceptional workflow diagram based on the information on all of the typical workflows and the information on the selected exceptional workflow.

When a sorting method for the exceptional workflows is specified via user input, the workflow model display unit 460 notifies the workflow sorter 470 of the specified sorting method to make the work sorter 470 determine an order of displaying the information indicative of the exceptional workflows. Then the workflow model display unit 460 displays a list of information indicative of the exceptional workflows in accordance with the display order determined by the workflow sorter 470.

When being notified of the sorting method from the workflow model display unit 460, the workflow sorter 470 refers to the information on the exceptional workflows stored in the workflow model storage unit 420, and determines an order of displaying all of the exceptional workflows based on the received sorting method. Then the workflow sorter 470 notifies the workflow model display unit 460 of the determined display order.

FIG. 12 shows an example data structure of an update history information table according to the second embodiment. The update history information table 410a shown in FIG. 12 is stored in the update history information storage unit 410.

The update history information table 410a contains update history information on every table updated in each update process in tabular form. The update history information table 410a has fields for process ID 411, table name 412, updated time 413, and attribute value 414. The information in fields arranged in a row is associated with each other and composes update history information.

The fields 411, 412, and 413 have the same meanings as the fields 111, 112, and 113 of the first embodiment shown in FIG. 5, respectively.

The field 414 contains a combination of an attribute name in a table and its updated value. That is, a combination of the attribute name of an attribute updated when the table indicated in the field 412 was updated in the data update process indicated in the field 411', and its updated value is set. For example, a string formed of an attribute name, "=", and an updated value is set. The field 414 may contain a plurality of combinations of attribute names and their updated values.

The update history information contained in the update history information table 410a is registered by the update history information acquisition unit 430. For example, information including a process ID of "0001", a table name of "request_info", an updated time of "2006/04/01 12:10:09", and an attribute value of "req=1011" is registered.

Figure 13:
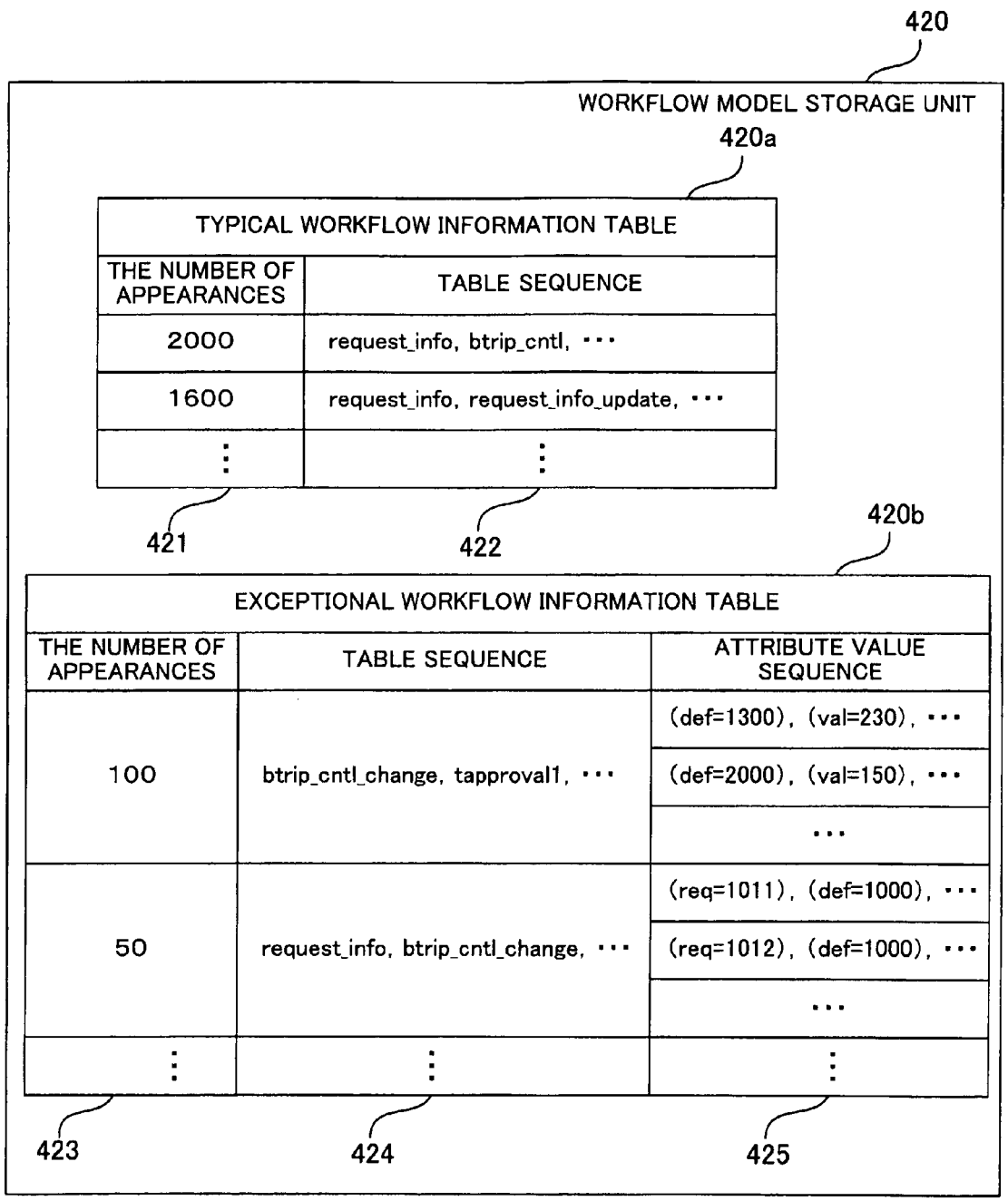
FIG. 13 is a view showing example data structures of a typical workflow information table and an exceptional workflow information table according to the second embodiment.

FIG. 13 shows an example of the data structures of a typical workflow information table and an exceptional workflow information table according to the second embodiment. The typical workflow information table 420a and the exceptional workflow information table 420b shown in FIG. 13 are stored in the workflow model storage unit 420.

The typical workflow information table 420a contains information on each workflow classified as a typical workflow in tabular form. The typical workflow information table 420a has fields for the number of appearances 421 and table sequence 422. Information in fields arranged in a row is associated with each other and composes typical workflow information.

The fields 421 and 422 have the same meanings as the fields 121 and 122 of the first embodiment shown in FIG. 6, respectively.

The typical workflow information contained in the typical workflow information table 420a is registered by the workflow classification unit 450. For example, information including the number of appearances of "2000", and a table sequence of "request_info, btrip_cntl, . . . (the rest is omitted)" is registered.

The exceptional workflow information table 420a contains information on each workflow classified as an exceptional workflow in tabular form. The exceptional workflow information table 420b has fields for the number of appearances 423, table sequence 424, and attribute value sequence 425. Information in fields arranged in a row is associated with each other and composes exceptional workflow information.

The fields 423 and 424 have the same meanings as the fields 123 and 124 of the first embodiment shown in FIG. 6, respectively.

The field 425 contains a sequence of information on updated attribute values in order of updating the tables indicated by the field 424. The information on attribute values includes at least one combination of an attribute name and its updated value. For example, a string formed of "(", attribute name, "=", updated value, and ")" is set. When there are a plurality of combinations of attribute names and their updated values, a comma is inserted between "(" and ")".

Information to be set in the field 424 and information to be set in the field 425 have one-to-many relationships. This is because there exists a plurality of data update processes which have a same order of updating tables but have different updated contents.

The exceptional workflow information contained in the exceptional workflow information table 420b is registered by the workflow classification unit 450. For example, information including the number of appearances of "100", a table sequence of "btrip_cntl_change, tapproval1, . . . (the rest is omitted)", an attribute value sequence "(def=1300), (val=230), . . . (the rest is omitted)" is registered.

Now the processes which are executed in the system with the above configuration and data structures will be described in detail. The procedures of the workflow extraction process and the workflow classification process are the same as those of the first embodiment shown in FIGS. 7 and 8. Now, a process of arranging information indicative of exceptional workflows will be described.

Figure 14:
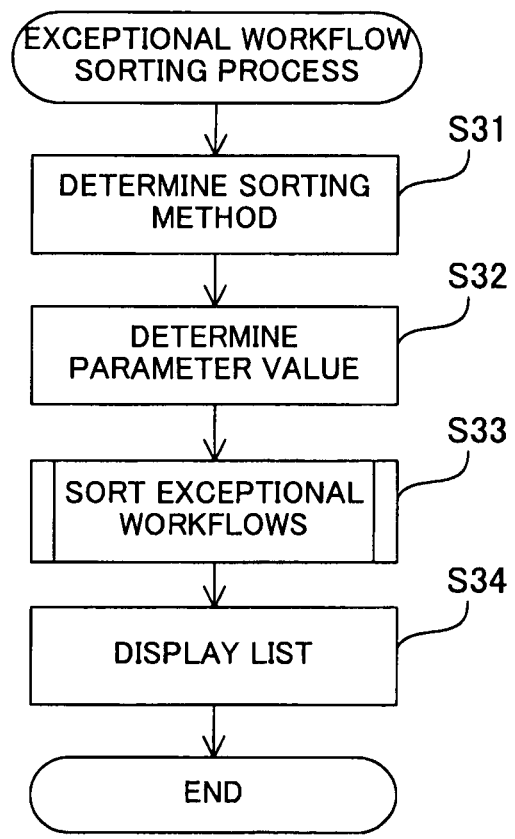
FIG. 14 is a flowchart showing a procedure of an exceptional workflow sorting process.

FIG. 14 is a flowchart showing a procedure of the exceptional workflow sorting process. This process shown in FIG. 14 will be described step by step.

[Step S31] The workflow model display unit 460 displays a list of selectable sorting methods, thereby allowing a user to select one sorting method. Then the workflow model display unit 460 determines the selected sorting method as a sorting method which is used for sorting information indicative of exceptional workflows.

[Step S32] The workflow model display unit 460 causes the user to enter the values of parameters that are required for the sorting method determined in step S31. Then the workflow model display unit 460 determines the entered values as parameter values to be used for the sorting. If the sorting method determined in step S31 does not require parameters to be specified, this step of causing the user to enter the values of parameters can be omitted.

[Step S33] The workflow model display unit 460 notifies the workflow sorter 470 of the sorting method determined in step S31 and the parameter values determined in step S32. The workflow sorter 470 determines an order of displaying information indicative of exceptional workflows stored in the workflow model storage unit 420 based on the received sorting method and parameter values.

[Step S34] The workflow sorter 470 notifies the workflow model display unit 460 of the display order determined in step S33. The workflow model display unit 460 displays a list of information indicative of the exceptional workflows in the received display order.

As described above, the workflow model display unit 460 acquires the sorting method and the information of the parameter values from the user. The workflow sorter 470 determines the display order of information indicative of the exceptional workflows based on the acquired sorting method and parameter values. Then the workflow model display unit 460 displays a list of information indicative of exceptional workflows in the determined display order.

Figure 15:
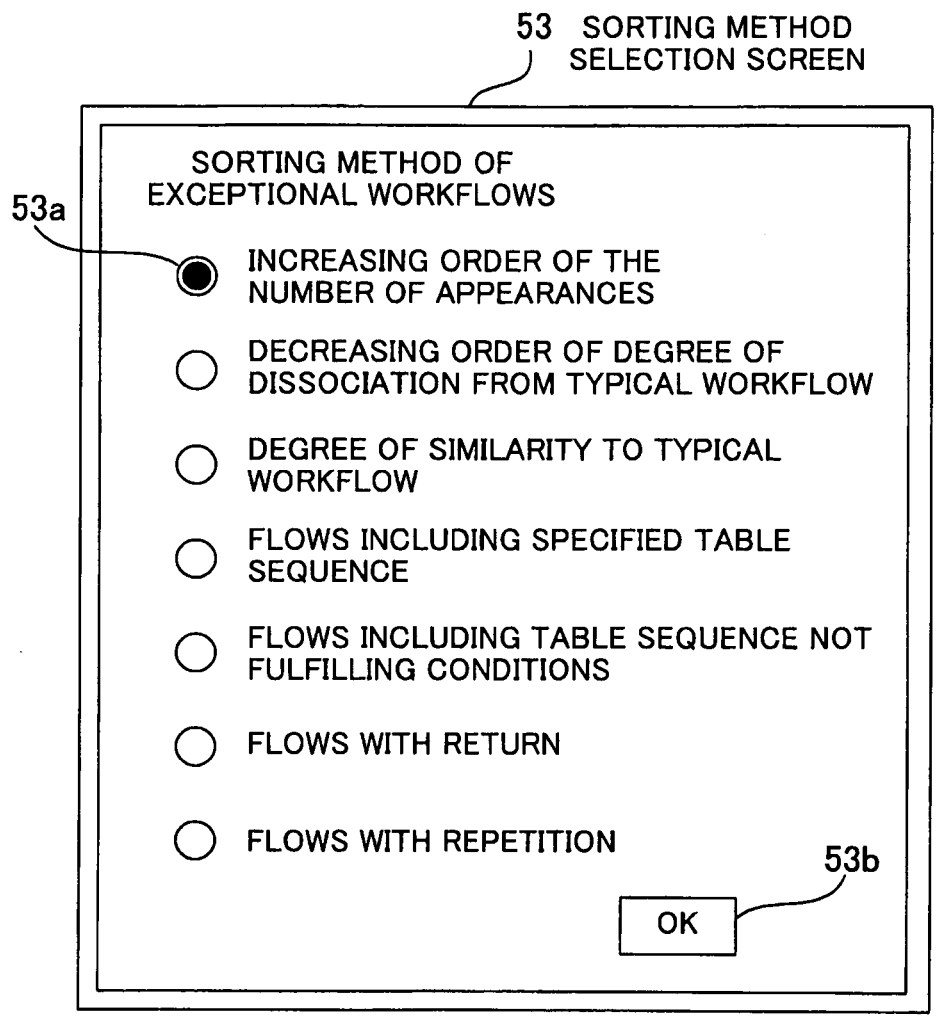
FIG. 15 is a view showing an example of a sorting method selection screen.

FIG. 15 shows an example of a sorting method selection screen. The sorting method selection screen 53 shown in FIG. 15 is a screen that is displayed on the monitor 50 by the workflow model display unit 460 in above step S31. The sorting method selection screen 53 displays a list of selectable sorting methods.

The sorting method selection screen 53 has a select button 53a and an ok button 53b. The select button 53a is a button for selecting one sorting method from the list. For example, the user selects one sorting method by changing the position of the select button 53a with the mouse 42. The ok button 53b is a button for fixing a selected sorting method. When the ok button 53b is pressed, the workflow model display unit 460 determines the selected sorting method as a sorting method for information indicative of exceptional workflows.

In this embodiment, as shown in FIG. 15, the user is able to select one out of seven sorting methods. "Increasing order of the number of appearances" is a method of sorting information in increasing order of the number of appearances. When "increasing order of the number of appearances" is selected in above step S31, the workflow sorter 470 sorts information in increasing order of the number of appearances in above step S33. This makes it possible to easily grasp exceptional workflows which rarely occur.

Now, the other six sorting methods: "decreasing order of degree of dissociation from typical workflow", "degree of similarity to typical workflow", "flows including specified table sequence", "flows including table sequence not fulfilling conditions", "flows with return", and "flows with repetition" will be described in detail.

Figure 16:
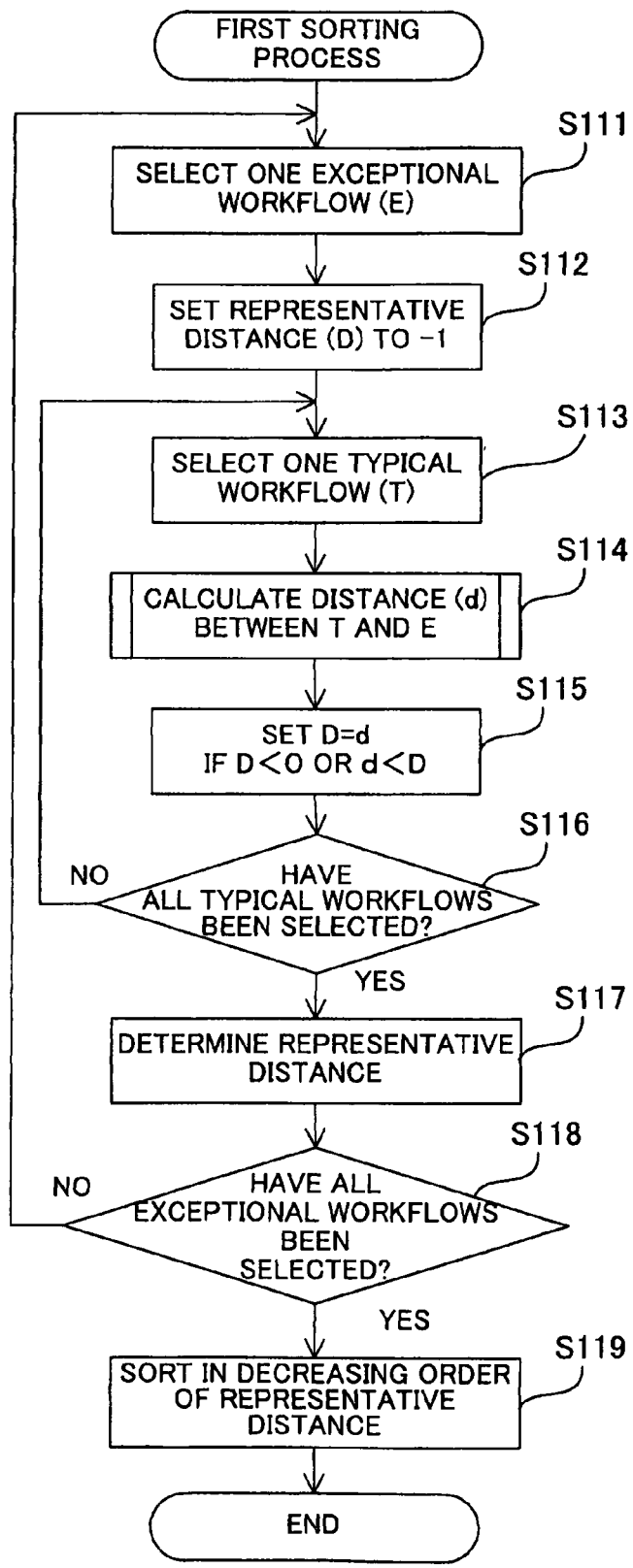
FIG. 16 is a flowchart showing a procedure of the first sorting process.

FIG. 16 is a flowchart showing a procedure of the first sorting process. This first sorting process shown in FIG. 16 is a process that is executed in above step S33 when "decreasing order of degree of dissociation from typical workflow" is determined as a sorting method in above step S31. The first sorting method does not require parameters to be specified. The process shown in FIG. 16 will be described step by step.

[Step S111] The workflow sorter 470 consults the exceptional workflow information table 420b stored in the workflow model storage unit 420 to select one exceptional workflow that has not been selected.

[Step S112] The workflow sorter 470 defines a representative distance as a variable, and initializes it to −1.

[Step S113] The workflow sorter 470 consults the typical workflow information table 420a stored in the workflow model storage unit 420 to select one typical workflow that has not been selected.

[Step S114] The workflow sorter 470 calculates a distance between the exceptional workflow selected in step S111 and the typical workflow selected in step S113. The distance is represented by an integral value greater zero and indicates a degree of dissociation between two table sequences. If two table sequences are completely identical to each other, the distance is zero. The larger a degree of dissociation between two table sequences is, the longer a distance between them is. More specifically, the Levenshtein distance is adopted for calculating the distance. A way of calculating the Levenshtein distance will be described later.

[Step S115] If the representative distance is smaller than zero, that is, if the initial value still remains, the workflow sorter 470 sets the representative distance to the distance calculated in step S114. Further, if the distance calculated in step S114 is smaller than the representative distance, the workflow sorter 470 updates the representative distance to the distance calculated in step S114.

[Step S116] The workflow sorter 470 determines whether all of the typical workflows have been selected in step S113. If all of the typical workflows have been selected, the process goes to step S117. If there is any typical workflow that has not been selected, the process goes back to step S113.

[Step S117] The workflow sorter 470 determines the current representative distance as a representative distance of the exceptional workflow selected in step S111.

[Step S118] The workflow sorter 470 determines whether all of the exceptional workflows have been selected in step S111. If all of the exceptional workflows have been selected, the process goes on to the step S119. If there is any exceptional workflow that has not been selected, the process goes back to step S111.

[Step S119] The workflow sorter 470 sorts all of the exceptional workflows in decreasing order of representative distance, and determines this order as a display order.

For example, assume that there are two typical workflows P and Q and three exceptional workflows R, S, and T. If it is assumed that distance (P,R)=3 and distance (Q,R)=4, the representative distance of exceptional workflow R is 3. Similarly, if it is assumed that distance (P,S)=2 and distance (Q,S)=5, the representative distance of exceptional workflow S is 2. Similarly, if it is assumed that distance (P,T)=4 and distance (Q,T)=4, the representative distance of exceptional workflow T is 4. In this case, a display order for the three exceptional workflows is an order of T, R, and S.

Figure 17:
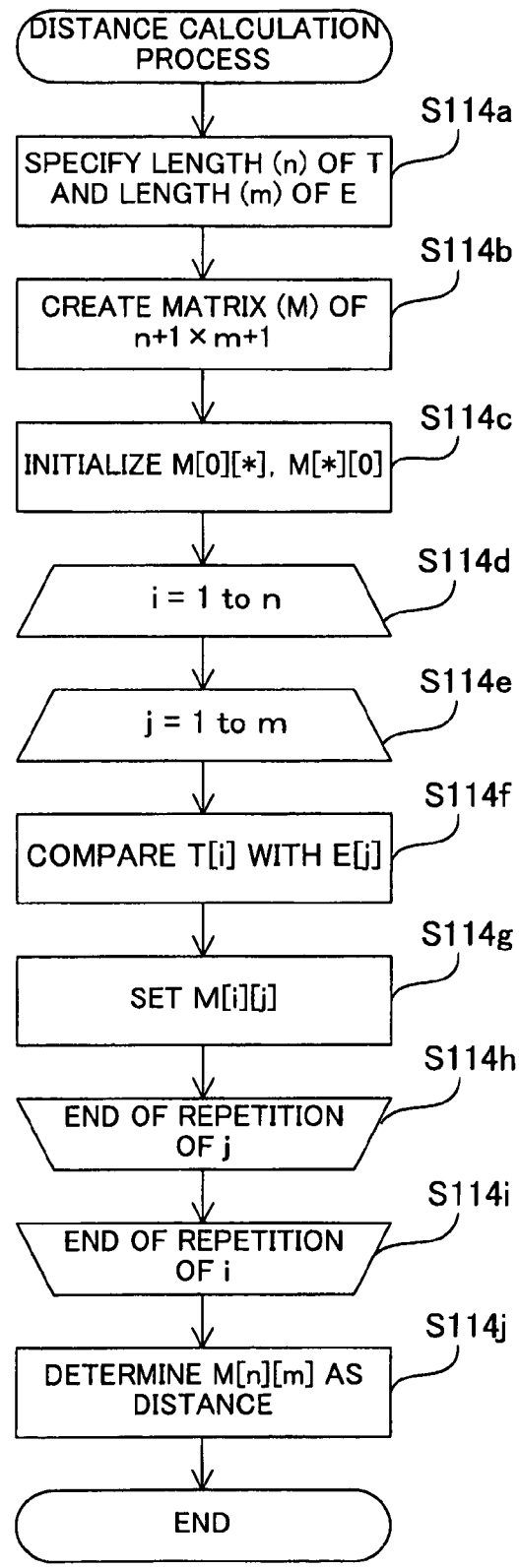
FIG. 17 is a flowchart showing a procedure of a distance calculation process.

FIG. 17 is a flowchart showing a procedure of a distance calculation process. The distance calculation process shown in FIG. 17 is a process that is executed in above step S114. The process shown in FIG. 17 will be described step by step.

[Step S114a] The workflow sorter 470 specifies the length (m) of the exceptional workflow selected in above step S111 and the length (n) of the typical workflow selected in above step S113. The length of a workflow indicates the number of table names included in a table sequence.

[Step S114b] The workflow sorter 470 defines a matrix of (n+1)*(m+1). That is, the number of rows in the matrix is determined by adding one to the length of the typical workflow specified in step S114a. The number of lines in the matrix is determined by adding one to the length of the exceptional workflow specified in step S114a.

[Step S114c] The workflow sorter 470 initializes the 0-th row and the 0-th line in the matrix defined in step S114b. More specifically, with respect to the 0-th row in the matrix, the workflow sorter 470 sets each position to a value that is equal to the value of a corresponding line, that is, sets position (0,0) to 0, position (0,1) to 1, . . . , position (0,m) to m. In addition, with respect to the 0-th line, the workflow sorter 470 sets each position to a value that is equal to the value of a corresponding row, that is, sets position (0,0) to 0, position (1,0) to 1, . . . , position (n,0) to n.

[Step S114d] The workflow sorter 470 selects the rows in the matrix from the first row to the n-th row one by one (the number of a row currently selected is taken to as i), and performs the following steps S114e to S114h on each row.

[Step S114e] The workflow sorter 470 selects positions from the first line to the m-th line of the row selected in step S114d, one by one (the number of a line currently selected is taken to as j), and performs the flowing steps S114f and S114g on each line.

[Step S114f] The workflow sorter 470 compares the i-th table name of the table sequence of the typical workflow with the j-th table name of the table sequence of the exceptional workflow, to determine whether they are the same.

[Step S114g] The workflow sorter 470 selects the smallest one of the values of the positions (i−1,j), (i,j−1), and (i−1,j−1) of the matrix. Then, if the workflow sorter 470 determines in step S114f that the two table names are the same, the workflow sorter 470 sets the selected value as the value of position (i,j). On the other hand, if it is determined that the two tables are not the same, the workflow sorter 470 sets a value obtained by adding one to the selected value, as the value of position (i,j).

[Step S114h] When the workflow sorter 470 finishes selecting the positions till the m-th line position in step S114e, it terminates repeating steps S114f and 114g.

[Step S114i] When the workflow sorter 470 finishes selecting the rows till the n-th row in step S114d, it terminates repeating steps S114e to S114h.

[Step S114j] The workflow sorter 47 determines the value of position (n,m) in the matrix as a distance between the exceptional workflow and the typical workflow.

FIG. 18 is a conceptual diagram showing a flow of the distance calculation process. FIG. 18 shows a procedure of the distance calculation process in the case where a typical workflow has a table sequence of "A, B1, C, D, E", and an exceptional workflow has a table sequence of "A, B2, C, D, E, F". As the typical workflow has a length of 5 and the exceptional workflow has a length of 6, a matrix of 6 rows*7 lines is defined.

Step ST1 shows a state after initialization is done in above step S114c. As described above, the 0-th row and the 0-th line in the matrix is initialized first. More specifically, values 0, 1, 2, 3, 4, 5, 6 are set in the 0-th row. In addition, values 0, 1, 2, 3, 4, 5 are set in the 0-th line.

Step ST2 shows a state after a process from steps S114e to S114h is done with respect to the 1st row. For example, with respect to position (1,1), two table names are the same, position (0,0) has the smallest value of 0 out of three, and therefore 0 is set. With respect to position (1,2), two table names are not the same, position (1,1) has the smallest value of 0 out of three, and therefore 1 is set.

Step ST3 shows a state where the distance calculation process has been finished. By performing the process from step S114a to S114j, 2 is set at position (5,6) in the matrix. Therefore, a distance between "A, B1, C, D, E" and "A, B2, C, D, E, F" is determined to be 2.

The Levenshtein distance intuitively indicates the number of operations, such as replacement, insertion, and deletion, required for converting one table sequence to another table sequence. For example, a table sequence "A, B1, C, D, E" can be converted to a table sequence "A, B2, C, D, E, F" by replacing "B1" with "B2" and adding "F". Therefore, the Levenshtein distance therebetween is determined to be 2. The Levenshtein distance can be mechanically calculated with the above-described algorithm.

Figure 19:
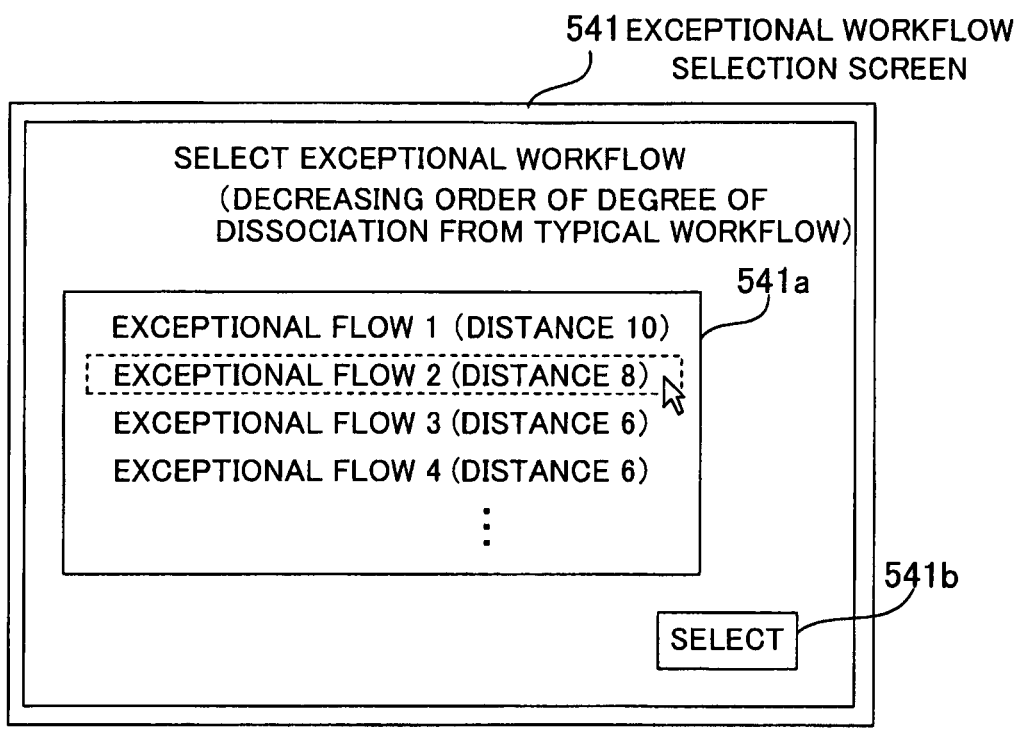
FIG. 19 is a diagram showing an example exceptional workflow selection screen for the first sorting process.

FIG. 19 shows an example of an exceptional workflow selection screen for the first sorting process. The exceptional workflow selection screen 541 shown in FIG. 19 is a screen that is displayed on the monitor 50 by the workflow model display unit 460 in above step S34 when "decreasing order of degree of dissociation from typical workflow" is determined as a sorting method in above step S31.

The exceptional workflow selection screen 541 has a selection field 541a and a select button 541b.

The selection field 541a is a field for selecting an exceptional workflow from a list. The selection field 541a displays a list of information indicative of exceptional workflows in decreasing order of representative distance. The information indicative of an exceptional workflow includes a representative distance of the exceptional workflow. The user is able to select one exceptional workflow in the selection field 541a.

The select button 541b is a button for fixing a selected exceptional workflow. When the select button 541b is pressed, the workflow model display unit 460 displays an exceptional workflow diagram on the monitor 50 based on all of the typical workflows and the selected exceptional workflow, similarly to the first embodiment.

As described above, in a sorting method of "decreasing order of degree of dissociation from typical workflow", an exceptional workflow with a higher degree of dissociation from a typical workflow is given a higher display order. This makes it possible to easily grasp abnormal exceptional workflows which greatly differ from typical workflows.

Figure 20:
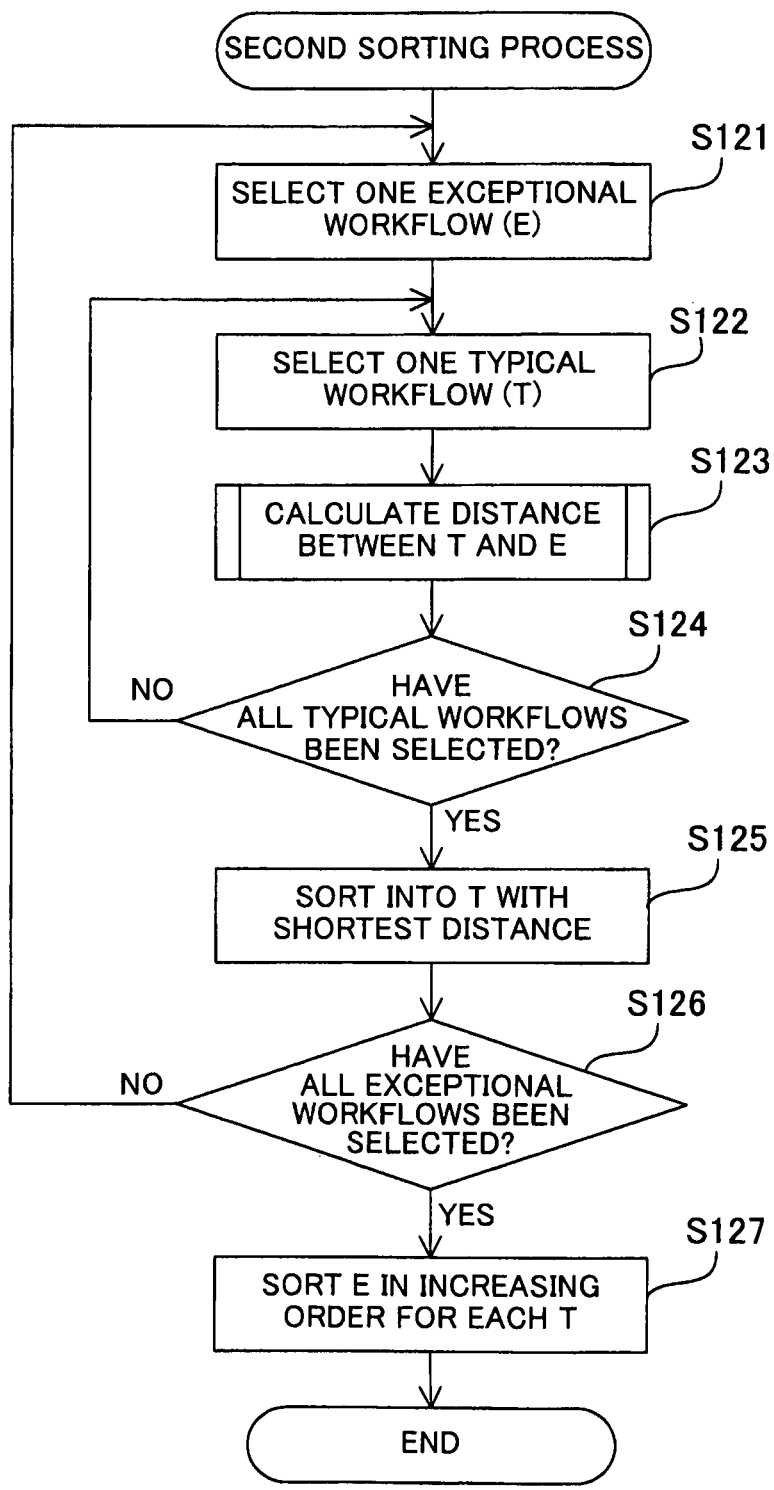
FIG. 20 is a flowchart showing a procedure of the second sorting process.

FIG. 20 is a flowchart showing a procedure of the second sorting process. The second sorting process shown in FIG. 20 is a process that is performed in above step S33 when "degree of similarity to typical workflow" is determined as a sorting method in step S31. This sorting process does not require parameters to be specified. Now, the process shown in FIG. 20 will be described step by step.

[Step S121] The workflow sorter 470 consults the exceptional workflow information table 420b stored in the workflow model storage unit 420 to select one exceptional workflow that has not been selected.

[Step S122] The workflow sorter 470 consults the typical workflow information table 420a stored in the workflow model storage unit 420 to select one typical workflow that has not been selected.

[Step S123] The workflow sorter 470 calculates a distance between the exceptional workflow selected in step S121 and the typical workflow selected step S122. The way of calculating the distance is the same as that used in step S114.

[Step S124] The workflow sorter 470 determines whether all typical workflows have been selected in step S122. If all typical workflows have been selected, the process goes on to step S125. If there is any typical workflow that has not been selected, the process goes back to step S122.

[Step S125] The workflow sorter 470 specifies a typical workflow with the smallest distance calculated in step S123. Then the workflow sorter 470 sorts the exceptional workflow selected in step S121 into the specified typical workflow. If there are a plurality of typical workflows with the smallest distance, the workflow sorter 470 sorts the exceptional workflow into the plurality of typical workflows.

[Step S126] The workflow sorter 470 determines whether all exceptional workflows have been selected in step S121. If all exceptional workflows have been selected, the process goes on to step S127. If there is any exceptional workflow that has not been selected, the process goes back to step S121.

[Step S127] The workflow sorter 470 sorts and displays the exceptional workflows sorted into each typical workflow in increasing order of distance from the typical workflow, on a typical workflow basis, and determines this order as a display order.

For example, assume that two typical workflows P="A1, B1, C1" and Q="A2, B2, C2" and two exceptional workflows S="A1, B1" and T="A2, C2". In this case, distance (P,S)=1 and distance (Q,S)=2, the exceptional workflow S is sorted into typical workflow P. In addition, distance (P,T)=2 and distance (Q,T)=1, the exceptional workflow T is sorted into typical workflow Q.

Figure 21:
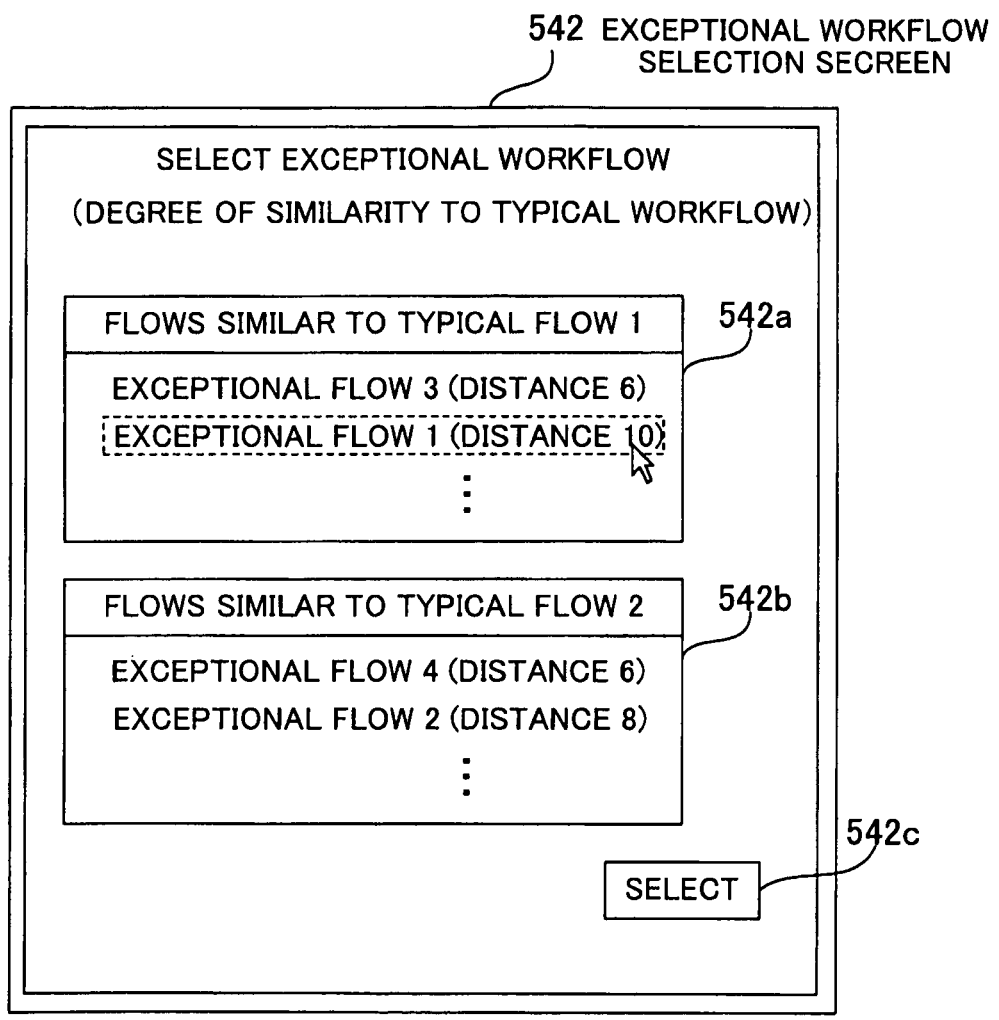
FIG. 21 is a diagram showing an example exceptional workflow selection screen for the second sorting process.

FIG. 21 shows an example of an exceptional workflow selection screen for the second sorting process. The exceptional workflow selection screen 542 shown in FIG. 21 is a screen that is displayed on the monitor 50 by the workflow model display unit 460 in above step S34 when "degree of similarity to typical workflow" is determined as a sorting method in above step S31.

The exceptional workflow selection screen 542 has selection fields 542a and 542b and a select button 542c.

The selection fields 542a and 542b are fields for selecting an exceptional workflow from a list. The select field 542a shows information indicative of exceptional flows sorted into the first typical workflow in increasing order of distance from the first typical workflow. The selection field 542b displays information indicative of exceptional workflows sorted into the second typical workflow in increasing order of distance from the second typical workflow. The information indicative of an exceptional workflow includes a distance. The user is able to select one exceptional workflow in the selection fields 542a and 542b.

The select button 542c is a button for fixing a selected exceptional workflow. When the select button 542c is pressed, the workflow model display unit 460 displays an exceptional workflow diagram on the monitor 50 based on all of the typical workflows and the selected exceptional workflow.

As described above, in the sorting method of "degree of similarity to typical workflow", an exceptional workflow is associated with a typical workflow which is similar thereto most. In addition, an exceptional workflow with a higher degree of similarity to a typical workflow is given a higher display order. This makes it possible to easily grasp exceptional workflows which are highly associated with each typical workflow.

Figure 22:
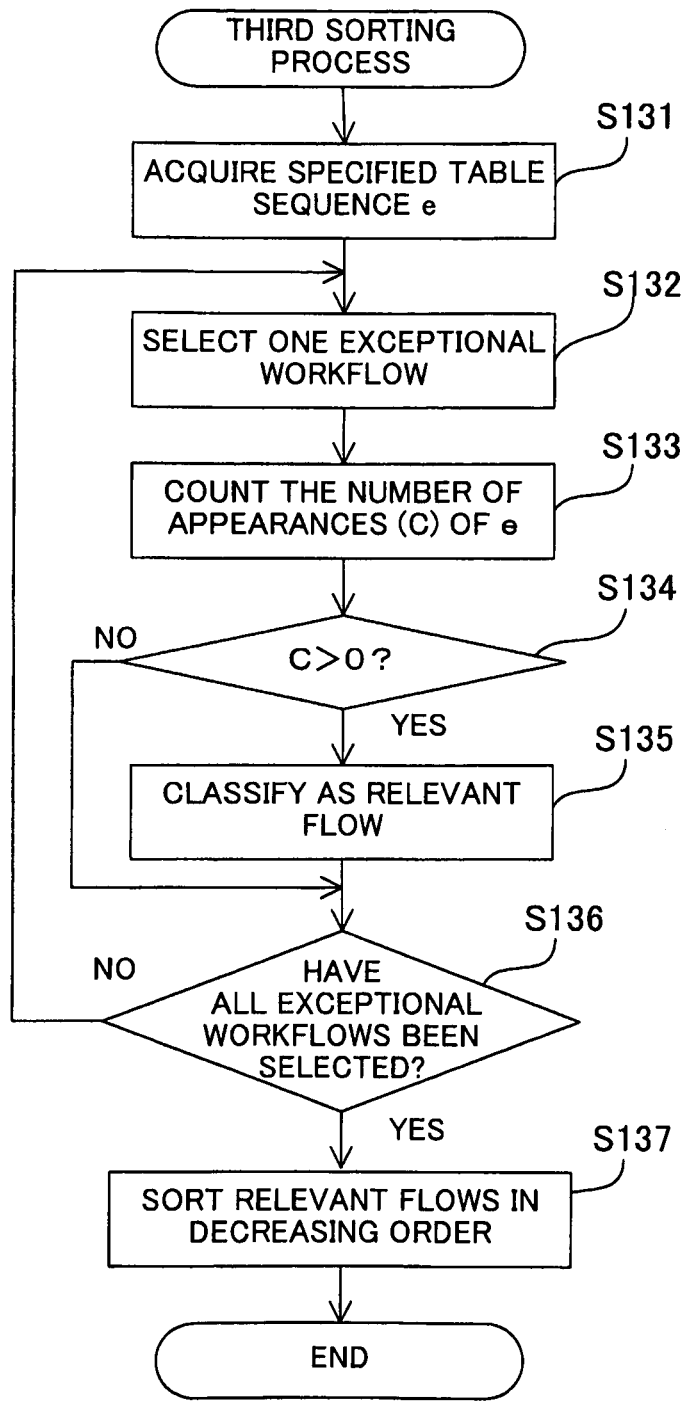
FIG. 22 is a flowchart showing a procedure of the third sorting process.

FIG. 22 is a flowchart showing a procedure of the third sorting process. The third sorting process shown in FIG. 22 is a process that is performed in above step S33 when "flows including specified table sequence" is determined as a sorting method in above step S31. The third sorting process requires a table sequence which is searched for to be specified as a parameter. The process shown in FIG. 22 will be described step by step.

[Step S131] The workflow sorter 470 acquires a specified table sequence as the value of a parameter from the workflow model display unit 460. The specified table sequence is a searching condition specified by the user. That is, exceptional workflows including the specified table sequence are to be searched for.

[Step S132] The workflow sorter 470 consults the exceptional workflow information table 420b stored in the workflow model storage unit 420 to select one exceptional workflow that has not been selected.

[Step S133] The workflow sorter 470 counts the number of appearances of the specified table sequence acquired in step S131 in the table sequence of the exceptional workflow selected in step S132.

[S134] The workflow sorter 470 determines whether the number of appearances counted in step S133 is greater than 0. If the number of appearances is greater than 0, the process goes on to step S135. If the number of appearances is equal to 0, the process goes on to step S136.

[Step S135] The workflow sorter 470 classifies the exceptional workflow selected in step S132 as a relevant flow.

[Step S136] The workflow sorter 470 determines whether all exceptional workflows have been selected in step S132. If all exceptional workflows have been selected, the process goes on to step S137. If there is any exceptional workflow that has not been selected, the process goes back to step S132.

[Step S137] The workflow sorter 470 sorts all exceptional workflows classified as the relevant flows in step S134, in decreasing order of the number of appearances, and determines this order as a display order. In addition, the workflow sorter 470 classifies all exceptional workflows which have not been classified as the relevant flows in step S134, as irrelevant workflows.

For example, assume that three exceptional workflows S="A, B, C", T="A, B, D", U="A, B, C, B, C". In addition, it is assumed that the user specified a table sequence of "B, C". In this case, the number of appearances in the exceptional workflow S is 1, the number of appearances in the exceptional workflow T is 0, and the number of appearances in the exceptional workflow U is 2. Therefore, the exceptional workflows S, T, and U are classified as relevant flows S and U and an irrelevant flow T. In addition, the display order for the two relevant flows is an order of U and S.

Figure 23:
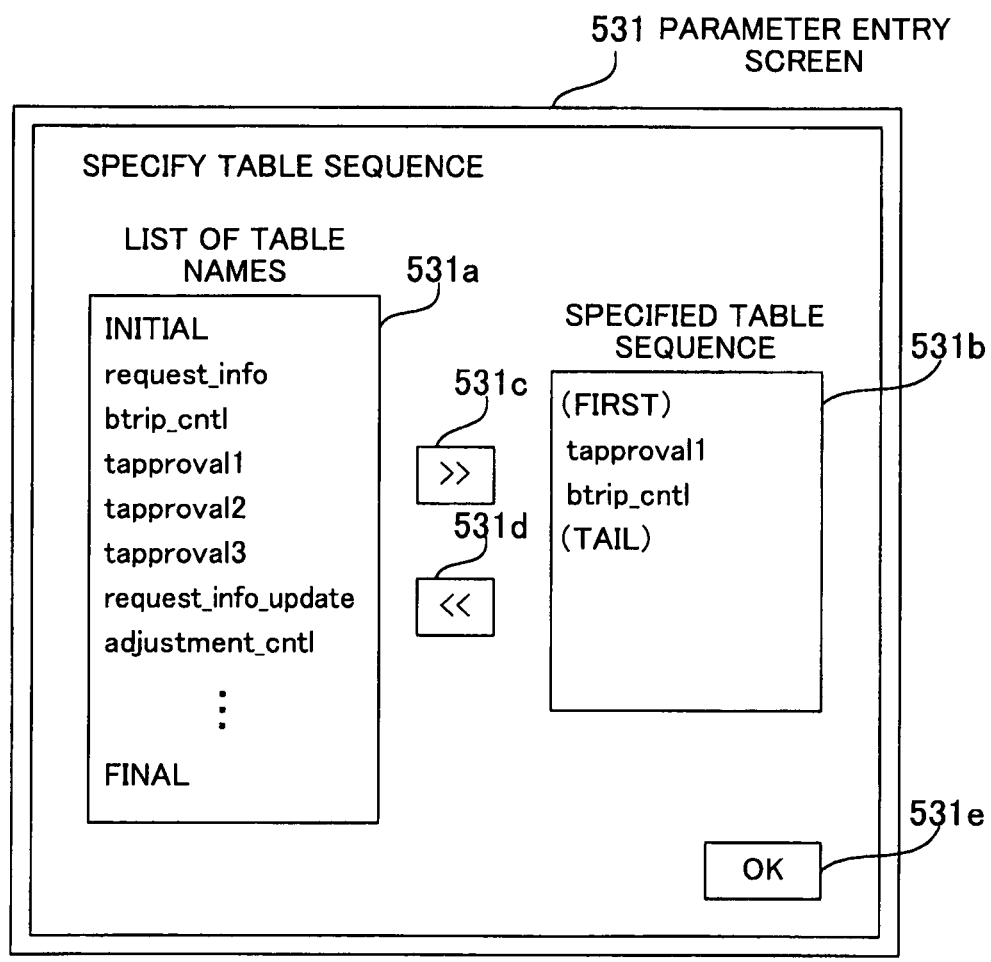
FIG. 23 is a diagram showing an example parameter entry screen for the third sorting process.

FIG. 23 shows an example of a parameter entry screen for the third sorting process. The parameter entry screen shown in FIG. 23 is a screen that is displayed on the monitor 50 by the workflow model display unit 460 after "flows including specified table sequence" is selected on the sorting method selection screen 53 shown in FIG. 15.

The parameter entry screen 531 has selection fields 531a and 531b, an add button 531c, a delete button 531d and an ok button 531e.

The selection field 531a is a field for selecting a table name from a list. The selection field 531a shows all table names. In addition, the selection field 531a shows "INITIAL" indicating the start of a workflow and "FINAL" indicating the end of the workflow. The user is able to select one out of the table names displayed in the selection field 531a.

The selection field 531b is a field for selecting table names to be included in a specified table sequence. The selection field 531b orders and shows the table names to be included in the specified table sequence. The user is able to select one table name in the selection field 531b.

The add button 531c is a button for adding a table name to the specified table sequence. When the add button 531c is pressed while a table name is selected in the selection field 531a, the selected table name is added at the tail of the specified table sequence.

The delete button 531d is a button for deleting one table name from the specified table sequence. When the deletion button 531d is pressed while a table name is selected in the selection field 531b, the selected table name is deleted from the specified table sequence.

The ok button 531e is a button for fixing the table names included in the specified table sequence. When the ok button 531e is pressed, the workflow model display unit 460 determines the entered specified table sequence as a parameter value.

Figure 24:
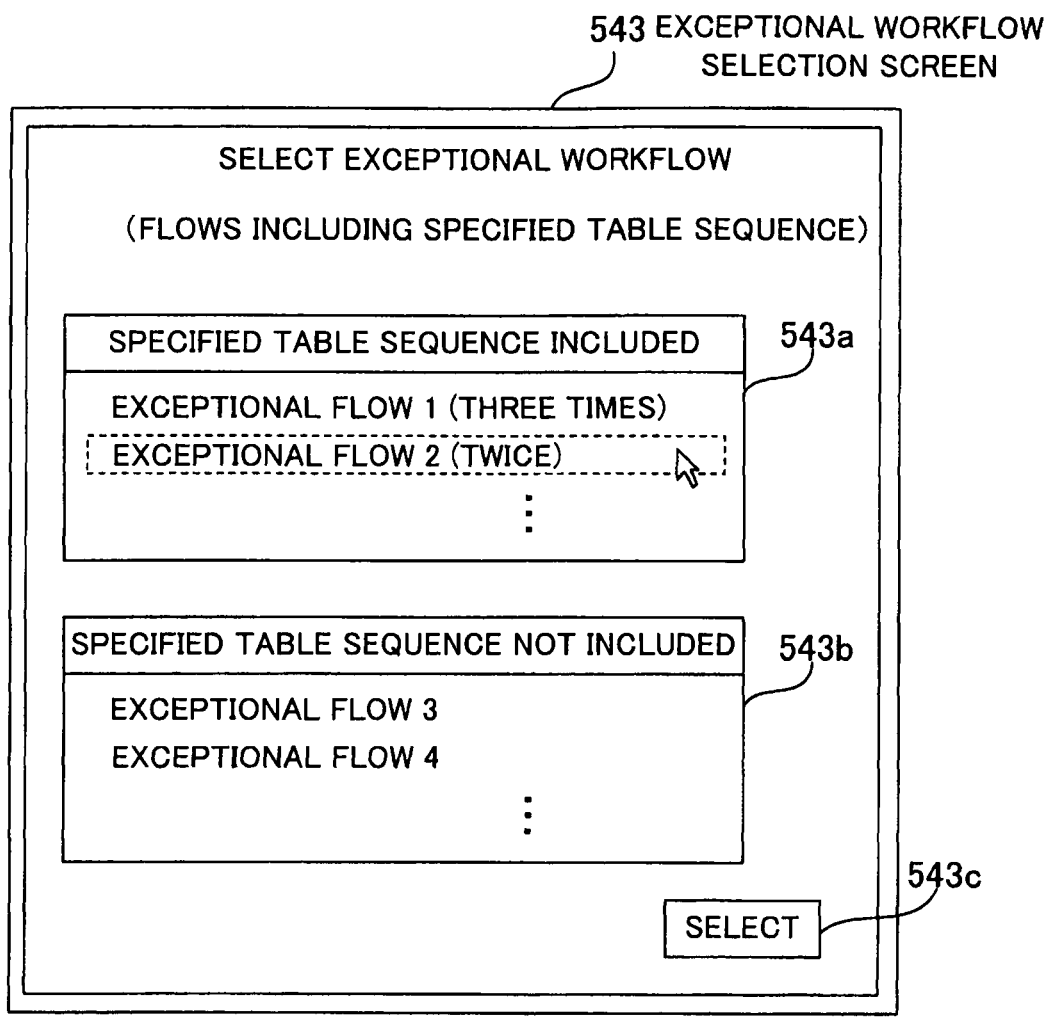
FIG. 24 is a diagram showing an example exceptional workflow selection screen for the third sorting process.

FIG. 24 shows an example of an exceptional workflow selection screen for the third sorting process. The exceptional workflow selection screen 543 shown in FIG. 24 is a screen that is displayed on the monitor 50 by the workflow model display unit 460 in above step S34 when "flows including specified table sequence" is determined as a sorting method in above step S31.

The exceptional workflow selection screen 543 has selection fields 543a and 543b and a select button 543c.

The selection fields 543a and 543b are fields for selecting an exceptional workflow from a list. The selection field 543a shows information indicative of exceptional workflows classified as relevant flows, in decreasing order of the number of appearances of a specified table sequence. The selection field 543b shows information indicative of exceptional workflows classified as irrelevant flows. The information indicative of an exceptional workflow classified as relevant flows includes the number of appearances. The user is able to select one exceptional workflow in the selection fields 543a and 543b.

The select button 543c is a button for fixing a selected exceptional workflow. When the select button 543c is pressed, the workflow model display unit 460 displays an exceptional workflow diagram on the monitor 50 based on all of the typical workflows and the selected exceptional workflow.

As described above, in the sorting method of "flows including specified table sequence", an exceptional workflow having a table sequence including a more number of appearances of a user-specified table sequence is given a higher display order. This makes it possible to easily find a data update process with an inappropriate order of updating tables.

Figure 25:
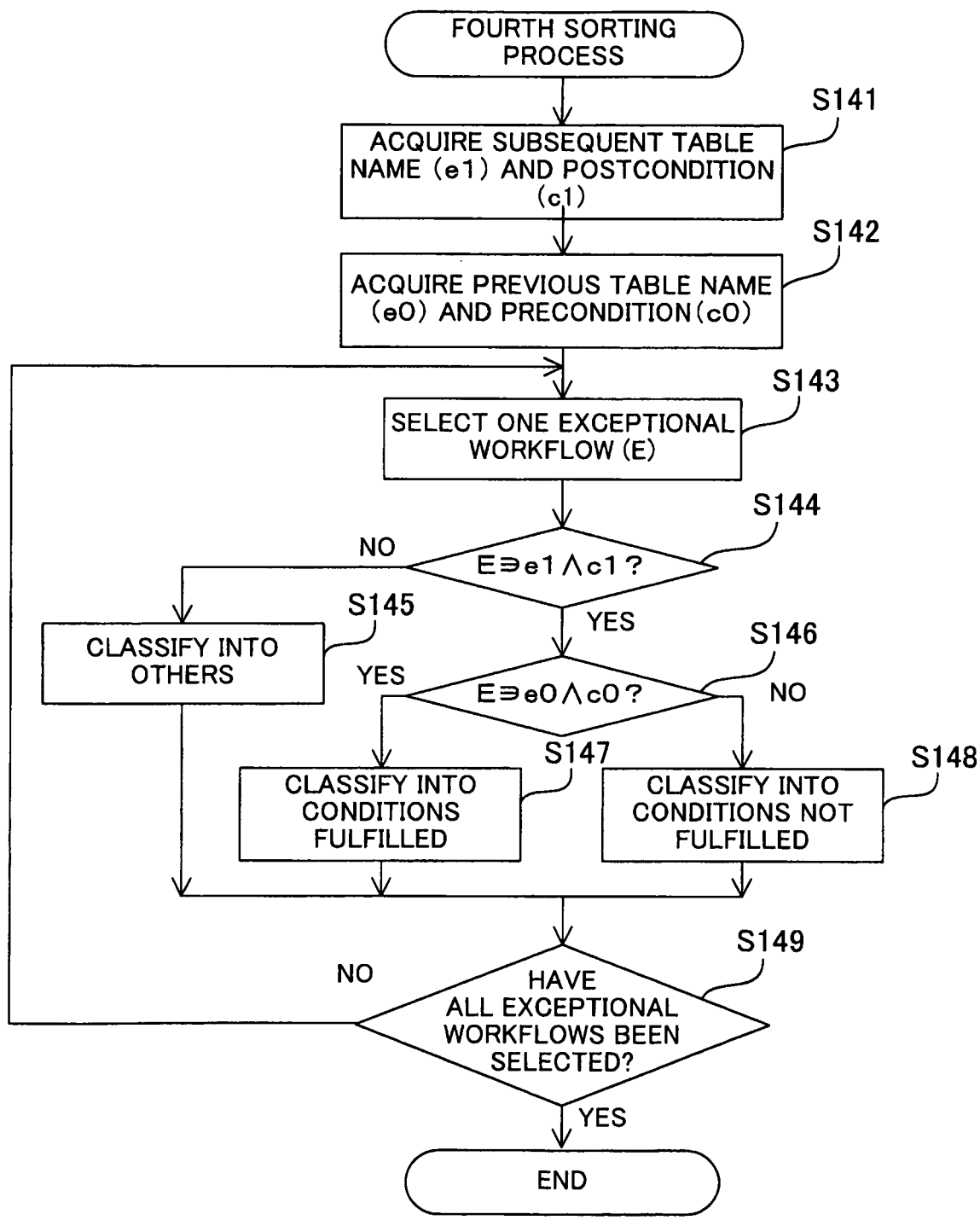
FIG. 25 is a flowchart showing a procedure of the fourth sorting process.

FIG. 25 is a flowchart showing a procedure of the fourth sorting process. The fourth sorting process shown in FIG. 25 is process that is executed in above step S33 when "flows including table sequence not fulfilling conditions" is determined as a sorting method in above step S31. In this connection, the fourth sorting process requires a previous table name, a subsequent table name, a precondition corresponding to the previous table name, and a postcondition corresponding to the subsequent table name to be specified as parameters. Now, the process shown in FIG. 25 will be described step by step.

[Step S141] The workflow sorter 470 acquires a subsequent table name and a postcondition as parameter values from the workflow model display unit 460. The subsequent table name and the postcondition are searching conditions specified by the user. That is, exceptional workflows including the subsequent table name and having an attribute value fulfilling the postcondition are to be searched for. In this connection, the postcondition may be omitted.

[Step S142] The workflow sorter 470 acquires a previous table name and a precondition as parameter values from the workflow model display unit 460. The previous table name and the precondition are necessary conditions that should be fulfilled by exceptional workflows including the subsequent table name and fulfilling the postcondition, which were acquired in step S141. That is, the exceptional workflows detected based on the subsequent table name and the postcondition are required to include the previous table name and have an attribute value fulfilling the precondition. In this connection, the precondition may be omitted.

[Step S143] The workflow sorter 470 consults the exceptional workflow information table 420b stored in the workflow model storage unit 420 to select one exceptional workflow that has not been selected.

[Step S144] The workflow sorter 470 determines whether the table sequence of the exceptional workflow selected in step S143 includes the subsequent table name acquired in step S141. In addition, the workflow sorter 470 determines whether all attribute values corresponding to the subsequent table name fulfill the postcondition acquired in step S141. In the case where the table sequence includes the subsequent table name and fulfills the postcondition, the process goes on to step S146. If the subsequent table name is not included or if there is any attribute value which does not fulfill the postcondition, the process goes on to step S145.

[Step S145] The workflow sorter 470 classifies the exceptional workflow selected in step S143 as other flow.

[Step S146] The workflow sorter 470 determines whether the table sequence of the exceptional workflow selected in step S143 includes the previous table name acquired in step S142. In addition, the workflow sorter 470 determines whether all attribute values corresponding to the previous table name fulfill the precondition acquired in step S142. If the previous table name is included and the precondition is fulfilled, the process goes on to step S147. If the previous table name is not included or if there is any attribute value which does not fulfill the precondition, the process goes on to step S148.

[Step S147] The workflow sorter 470 classifies the exceptional workflow selected in step S143 as a flow fulfilling conditions.

[Step S148] The workflow sorter 470 classifies the exceptional workflow selected in step S143 as a flow not fulfilling conditions.

[Step S149] The workflow sorter 470 determines whether all exceptional workflows have been selected in step S143. If all the exceptional workflows have been selected, the process is completed. If there is any exceptional workflow that has not been selected, the process goes back to step S143.

For example, assume that there are three exceptional workflows S="A, B, C, D", T="A, C, D", U="A, E, D". In addition, it is assumed that the exceptional workflow S has an attribute value "amount=120", the exceptional workflow T has an attribute value "amount=150", and the exceptional workflow U has an attribute value "amount=80", with respect to the table name "D". It is also assumed that the user specifies a subsequent table name of "D", a postcondition of "amount>=100", and a previous table name of "B".

In this case, the exceptional workflow S has a table sequence which includes the subsequent table name and fulfills the postcondition, and also includes the previous table name. Therefore, the exceptional workflow S is classified as a flow fulfilling conditions. The exceptional workflow T has a table sequence which includes the subsequent table name and fulfills the postcondition, but does not includes the previous table name. Therefore, the exceptional workflow T is classified as a flow not fulfilling conditions. The exceptional workflow U has a table sequence which includes the subsequent table name but does not fulfill the postcondition. Therefore the exceptional workflow U is classified as other flow.

Figure 26:
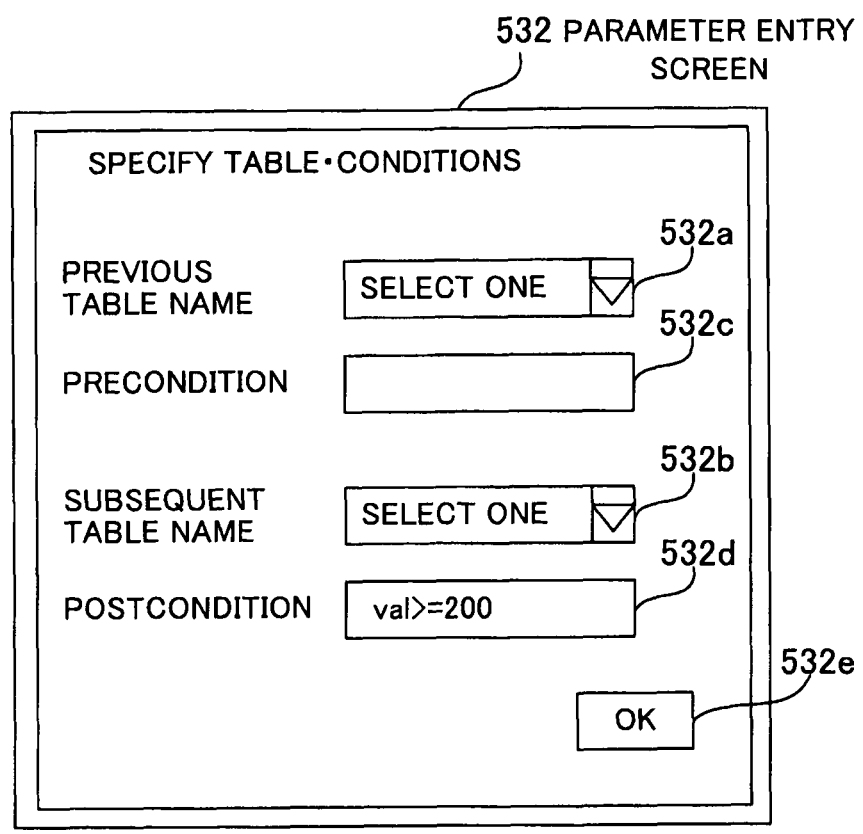
FIG. 26 is a diagram showing an example parameter entry screen for the fourth sorting process.

FIG. 26 shows an example of a parameter entry screen for the fourth sorting process. The parameter entry screen 532 shown in FIG. 26 is a screen that is displayed on the monitor 50 by the workflow model display unit 460 after "flows including table sequence not fulfilling conditions" is selected on the sorting method selection screen 53 shown in FIG. 15.

The parameter entry screen 532 has selection fields 532a and 532b, entry fields 532c and 532d, and an ok button 532e.

The selection field 532a is a field for selecting a previous table name from a list. The user is able to select one table name in the selection field 532a. The selection field 532b is a field for selecting a subsequent table name from a list. The user is able to select one table name in the selection field 532b.

The entry field 532c is a field for entering a precondition. The user is able to enter a literal such as numeral values and strings, and a logical formula including an equal sign and inequality in the entry field 532c. The entry field 532d is a field for entering a postcondition. The user is able to enter a logical formula in the entry field 532d.

The ok button 532e is a button for fixing a previous table name, a subsequent table name, a precondition, and a postcondition. When the ok button 532e is pressed, the workflow model display unit 460 determines the entered contents as parameter values.

Figure 27:
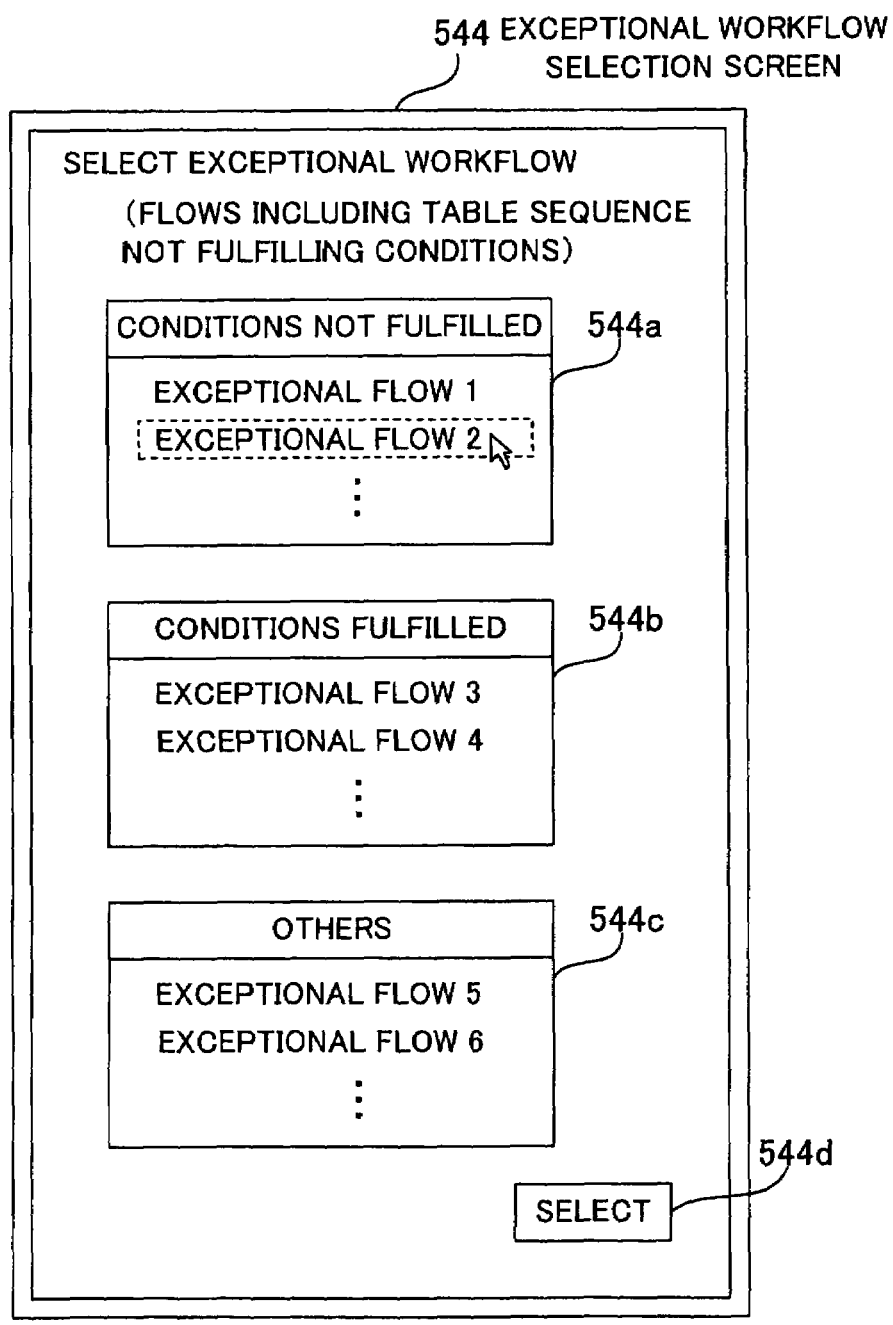
FIG. 27 is a diagram showing an example exceptional workflow selection screen for the fourth sorting process.

FIG. 27 shows an example of an exceptional workflow selection screen for the fourth sorting process. The exceptional workflow selection screen 544 shown in FIG. 27 is a screen that is displayed on the monitor 50 by the workflow model display unit 460 in above step S34 when "flows including table sequence not fulfilling conditions" is determined as a sorting method in above step S31.

The exceptional workflow selection screen 544 has selection fields 544a, 544b, and 544c, and a select button 544d.

The selection fields 544a, 544b, and 544c are fields for selecting an exceptional workflow from a list. The selection field 544a shows information indicative of exceptional workflows classified as flows not fulfilling conditions. The selection field 544b shows information indicative of exceptional workflows classified as flows fulfilling conditions. The selection field 544c shows information indicative of exceptional workflows classified as other flows. The user is able to select one exceptional workflow in the selection fields 544a, 544b, and 544c.

The select button 544d is a button for fixing a selected exceptional workflow. When the select button 544d is pressed, the workflow model display unit 460 displays an exceptional workflow diagram on the monitor 50 based on all of the typical workflows and the selected exceptional workflow.

As described above, in the sorting method of "flows including table sequence not fulfilling conditions", exceptional workflows which do not include a previous table name or do not fulfill a precondition are extracted from exceptional workflows that include a subsequent table name and fulfill a postcondition, in response to user inputs specifying these table names and conditions. This makes it possible to easily detect data update processes which produced inappropriate update of tables.

Figure 28:
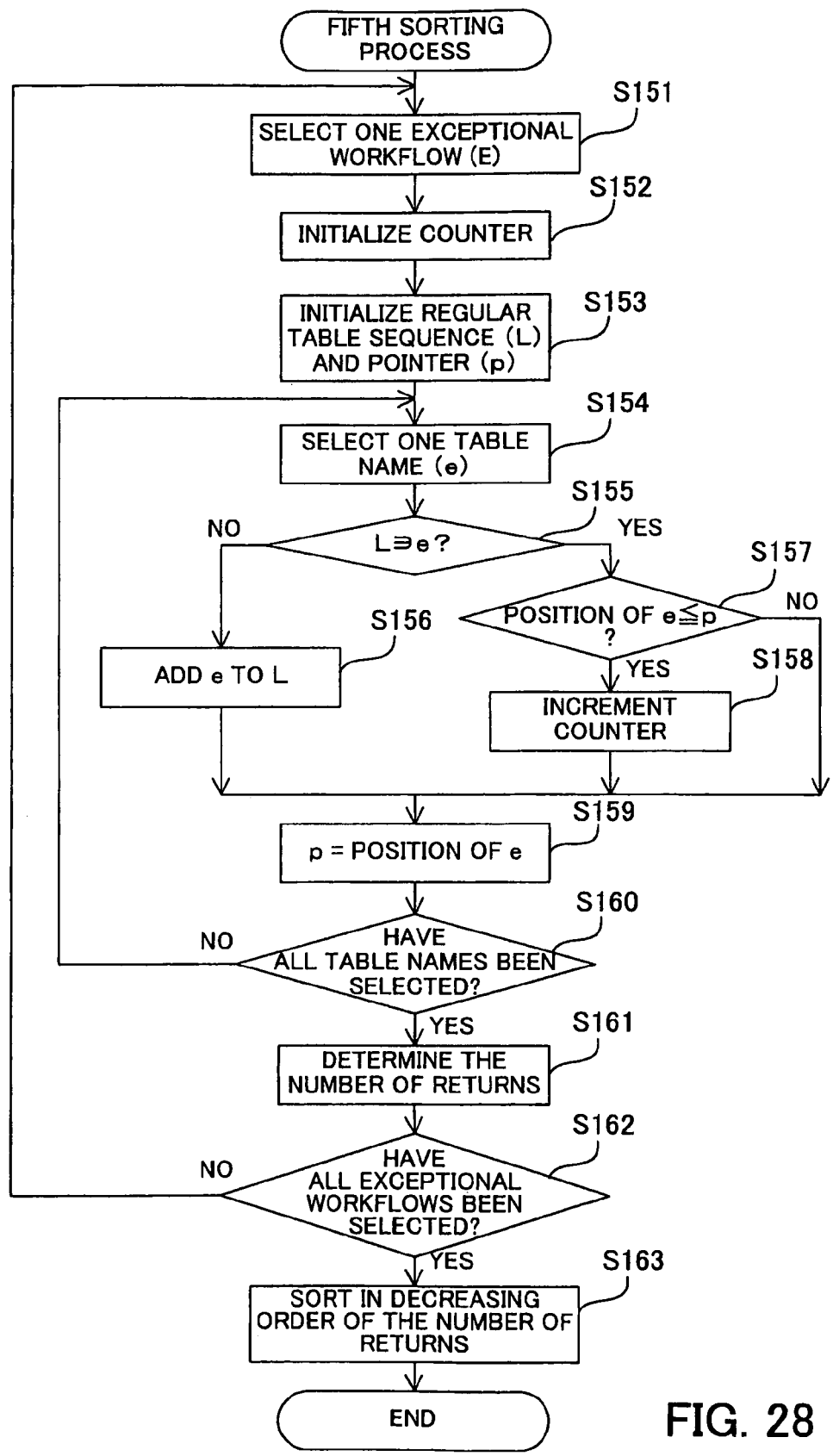
FIG. 28 is a flowchart showing a procedure of the fifth sorting process.

FIG. 28 is a flowchart showing a procedure of the fifth sorting process. The fifth sorting process shown in FIG. 28 is a process that is executed in above step S33 when "flows with return" is determined as a sorting method in above step S31. The fifth sorting process does not require parameters to be specified. The process shown in FIG. 28 will be described step by step.

[Step S151] The workflow sorter 470 consults the exceptional workflow information table 420b stored in the workflow model storage unit 420 to select one exceptional workflow that has not been selected.

[Step S152] The workflow sorter 470 defines a counter as a variable and initializes the counter to 0.

[Step S153] The workflow sorter 470 defines a regular table sequence as a variable, and initializes the regular table sequence to a null sequence. In addition, the workflow sorter 470 defines a pointer as a variable, and initializes the pointer to 0.

[Step S154] The workflow sorter 470 selects one table name that has not been selected, in order from the first table name, from the table sequence of the exceptional workflow selected in step S151.

[Step S155] The workflow sorter 470 determines whether the table name selected in step S154 is included in the regular table sequence. If the table name is not included, the process goes on to step S156. If the table name is included, the process goes on to step S157.

[Step S156] The workflow sorter 470 adds the table name selected in step S154 at the tail of the regular table sequence.

[Step S157] The workflow sorter 470 determines whether a value indicating a position of the table name selected in step S154 in the regular table sequence is equal to or lower than the pointer value. If the value is equal to or lower than the pointer value, the process goes on to step S158. If the value is greater than the pointer value, the process goes on to step S159. The value indicating a position in the regular table sequence is represented by an integral number of 1 or greater.

[Step S158] The workflow sorter 470 increments the counter value by 1.

[Step S159] The workflow sorter 470 sets the pointer value to a value indicating the position of the table name selected in step S154 in the regular table sequence.

[Step S160] The workflow sorter 470 determines whether all table names have been selected in step S154. If all table names have been selected, the process goes on to step S161. If there is any table name that has not been selected, the process goes back to step S154.

[Step S161] The workflow sorter 470 determines the current counter value as the number of returns of the exceptional workflow selected in step S151.

[Step S162] The workflow sorter 470 determines whether all exceptional workflows have been selected in step S151. If all exceptional workflows have been selected, the process goes on to step S163. If there is any exceptional workflow that has not been selected, the process goes on to step S151.

[Step S163] The workflow sorter 470 sorts all of the exceptional workflows in decreasing order of the number of returns determined in step S161, and determines this order as a display order.

FIG. 29 is a conceptual diagram showing a flow of the fifth sorting process. FIG. 29 shows a flow of counting the number of returns in the case where an exceptional flow has a table sequence of "A, B, C, D, B, C, E, C, D". The process shown in FIG. 29 will be described step by step.

[Step ST11] The first table name "A" is selected from the table sequence. At this time, the regular table sequence is null. Then, a table name "A" is added to the regular table sequence, and the pointer value is set to 1.

[Step ST12] The second table name "B" is selected from the table sequence. At this time, the regular table sequence does not include the table name "B". Therefore, the table name "B" is added at the tail of the regular table sequence, and the pointer value is set to 2.

[Step ST13] The third table name "C" is selected from the table sequence. At this time, the regular table sequence does not include the table name C. Therefore, the table name "C" is added at the tail of the regular table sequence, and the pointer value is set to 3.

[Step ST14] The fourth table name "D" is selected from the table sequence. At this time, the regular table sequence does not include the table name D. Therefore, the table name "D" is added at the tail of the regular table sequence, and the pointer value is set to 4.

[Step ST15] The fifth table name "B" is selected from the table sequence. At this time, the regular table sequence already includes the table name "B", and the position of the table name B in the regular table sequence is before the position indicated by the current pointer (position of table name "D"). Therefore, the counter value is incremented to 1, and the pointer value is set to 2.

[Step ST16] The sixth table name "C" is selected from the table sequence. The regular table sequence already includes the table name "C" and the position of the table name "C" in the regular table sequence is after the position indicated by the current pointer (position of table name "B"). Therefore, the pointer value is set to 3.

[Step ST17] The seventh table name "E" is selected from the table sequence. At this time, the regular table sequence does not include the table name E. Therefore, the table name "E" is added at the tail of the regular table sequence, and the pointer value is set to 5.

[Step ST18] The eighth table name "C" is selected from the table sequence. At this time, the regular table sequence already includes the table name "C", and the position of the table name "C" in the regular table sequence is before the position indicated by the current pointer (position of table name "E"). Therefore, the counter value is incremented to 2, and the pointer value is set to 3.

[Step ST19] The ninth table name "D" is selected from the table sequence. The regular table sequence already includes the table name "D" and the position of the table name "D" in the regular table sequence is after the position indicated by the current pointer (position of table name "C"). Therefore, the pointer value is set to 4.

With the above process, the number of returns of the table sequence "A, B, C, D, B, C, E, C, D" is counted to 2.

Figure 30:
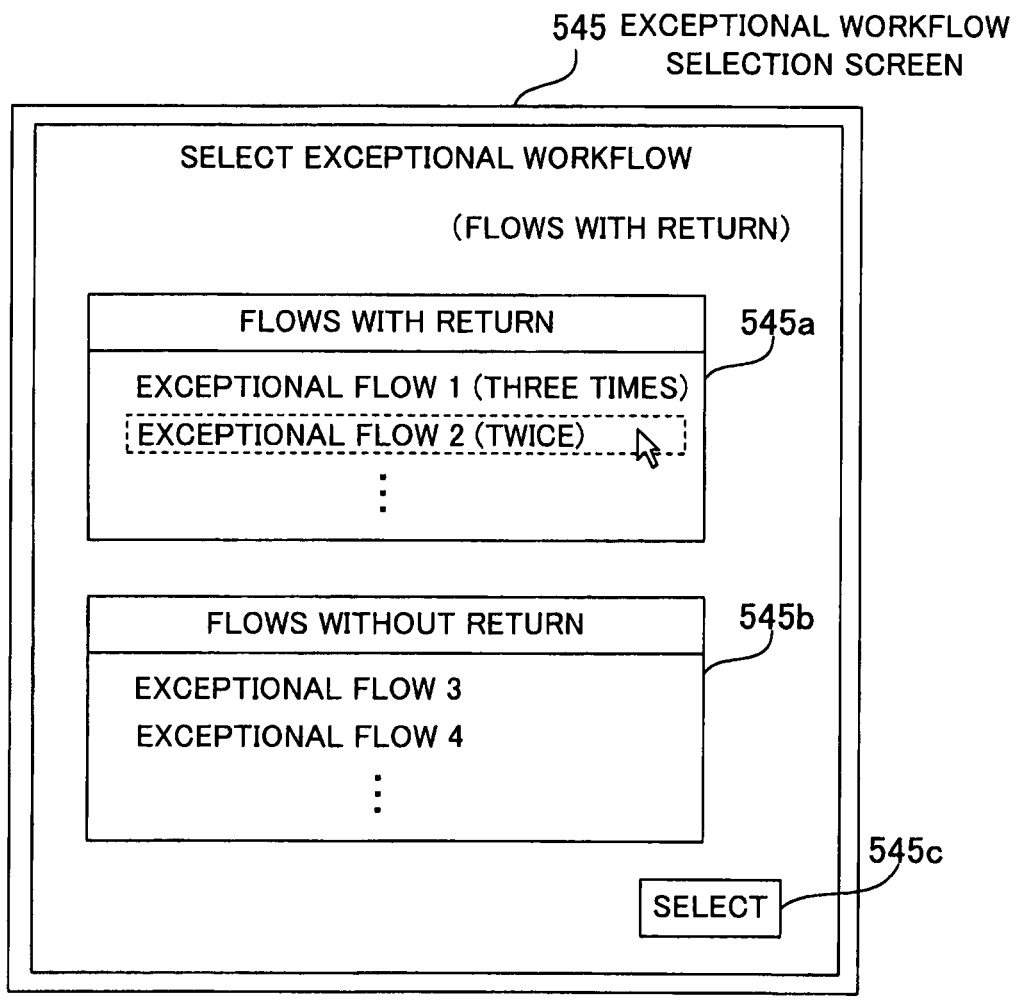
FIG. 30 is a diagram showing an example exceptional workflow selection screen for the fifth sorting process.

FIG. 30 shows an example of an exceptional workflow selection screen for the fifth sorting process. The exceptional workflow selection screen 545 shown in FIG. 30 is a screen that is displayed on the monitor 50 by the workflow model display unit 460 in above step S34 when "flows with return" is determined as a sorting method in above step S31.

The exceptional workflow selection screen 545 has selection fields 545a and 545b and a select button 545c.

The selection fields 545a and 545b are fields for selecting an exceptional workflow from a list. The selection field 545a shows information indicative of exceptional workflows with one or more returns, in decreasing order of the number of returns. The selection field 545b shows information indicative of exceptional workflows with no returns. The information indicative of an exceptional workflow with one or more returns includes the number of returns. The user is able to select one exceptional workflow in the selection fields 545a and 545b.

The select button 545c is a button for fixing a selected exceptional workflow. When the select button 545c is pressed, the workflow model display unit 460 displays an exceptional workflow diagram on the monitor 50 based on all of the typical workflows and the selected exceptional workflow.

As described above, in the sorting method of "flows with return", an exceptional workflow with a greater number of returns is given a higher display order. This makes it possible to easily grasp inefficient workflows.

Figure 31:
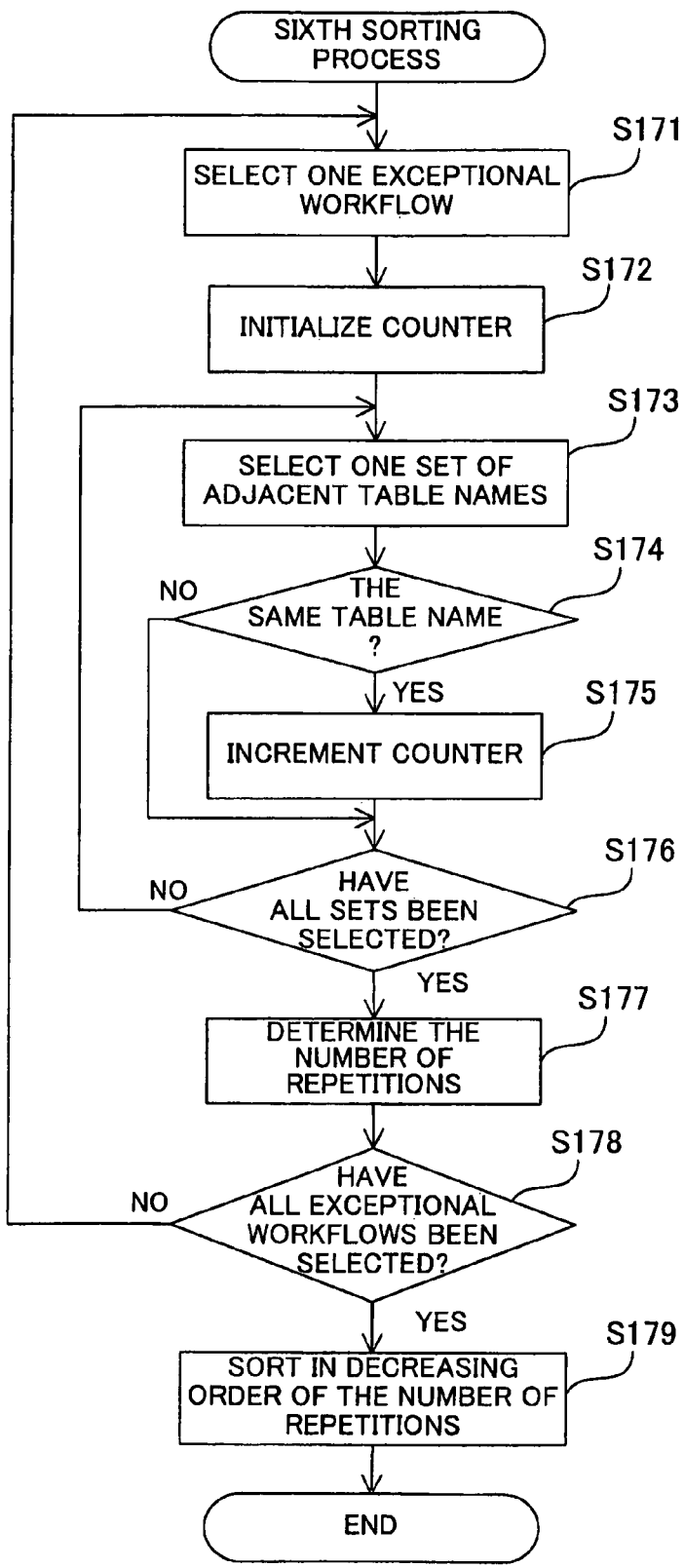
FIG. 31 is a flowchart showing a procedure of the sixth sorting process.

FIG. 31 is a flowchart showing a procedure of the sixth sorting process. The sixth sorting process shown in FIG. 31 is a process that is executed in above step S33 when "flows with repetition" is determined as a sorting method in above step S31. In this connection, the sixth sorting process does not require parameters to be specified. The process shown in FIG. 31 will be described step by step.

[Step S171] The workflow sorter 470 consults the exceptional workflow information table 420b stored in the workflow model storage unit 420 to select one exceptional workflow that has not been selected.

[Step S172] The workflow sorter 470 defines a counter as a variable, and initializes it to 0.

[Step S173] The workflow sorter 470 selects a set of two adjacent table names, in order from the beginning of the table sequence of the exceptional workflow selected in step S171.

[Step S174] The workflow sorter 470 determines whether the two table names selected in step S173 are the same. If they are the same, the process goes on to step S175. If they are not, the process goes on to step S176.

[Step S175] The workflow sorter 470 increments the counter by 1.

[Step S176] The workflow sorter 470 determines whether all sets of two adjacent table names have been selected in step S173. If all sets of table names have been selected, the process goes on to step S177. If there is any set of table names which has not been selected, the process goes on to step S173.

[Step S177] The workflow sorter 470 determines the current count value as the number of repetitions with respect to the exceptional workflow selected in step S171.

[Step S178] The workflow sorter 470 determines whether all exceptional workflows have been selected in step S171. If all exceptional workflows have been selected, the process goes on to step S179. If there is any exceptional workflow which has not been selected, the process goes on to step S171.

[Step S179] The workflow sorter 470 sorts all exceptional workflows in decreasing order of the number of repetitions determined in step S177, and determines this order as a display order.

For example, assume that an exceptional workflow has a table sequence of "A, B, B, B, C, C, D". In this case, out of six sets of two adjacent table names, three sets: (A, B), (B, C), and (C, D) have different table names, and the other three sets: (B, B), (B, B), and (C, C) have the same table names. Therefore, the number of repetitions of the table sequence "A, B, B, B, C, C, D" is 3.

Figure 32:
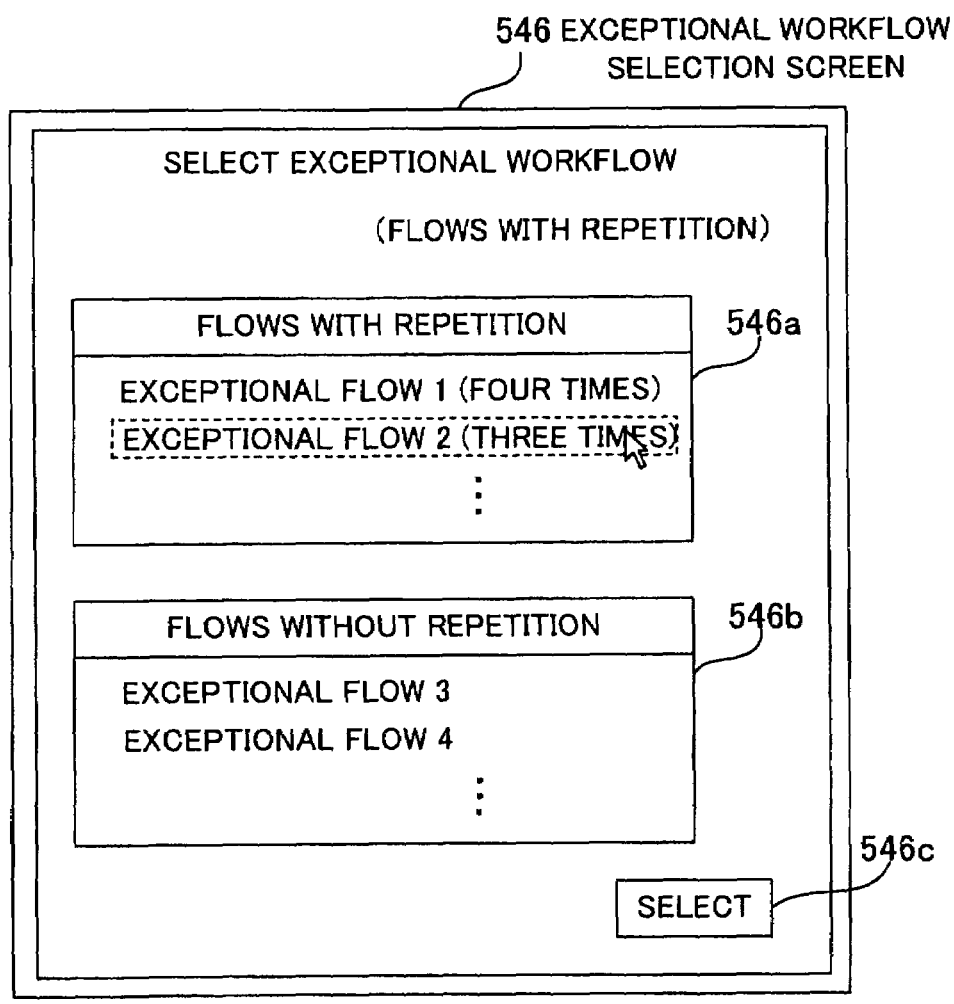
FIG. 32 is a diagram showing an example exceptional workflow selection screen for the sixth sorting process.

FIG. 32 shows an example of an exceptional workflow selection screen for the sixth sorting process. The exceptional workflow selection screen 546 shown in FIG. 32 is a screen that is displayed on the monitor 50 by the workflow model display unit 460 in above step S34 when "flows with repetition" is determined as a sorting method in above step S31.

The exceptional workflow selection screen 546 has selection fields 546a and 546b and a select button 546c.

The selection fields 546a and 546b are fields for selecting an exceptional workflow from a list. The selection field 546a shows information indicative of exceptional workflows with one or more repetitions, in decreasing order of the number of repetitions. The selection field 546b shows information indicative of exceptional workflows with no repetitions. Information indicative of an exceptional workflow with one or more repetitions includes the number of repetitions. The user is able to select one exceptional workflow in the selection fields 546a and 546b.

The select button 546c is a button for fixing a selected exceptional workflow. When the select button 546c is pressed, the workflow model display unit 460 displays an exceptional workflow diagram on the monitor 50 based on all typical workflows and the selected exceptional workflow.

As described above, in the sorting method of "flows with repetition", an exceptional workflow with a greater number of successive updates of a same table is given a higher display order. This makes it possible to easily grasp inefficient workflows.

This embodiment is designed to allow one of the seven sorting methods to be selected. However, two or more sorting methods can be combined as long as they do not have any inconsistency.

Such the workflow analysis device 400 can provide the same effects as the workflow analysis device 100 of the first embodiment. In addition, the workflow analysis device 400 can easily extract workflows fulfilling specified conditions out of exceptional workflows. As the exceptional workflows are the ones that occur less frequently, there may be lots of workflows with a small number of appearances. Therefore, the function of the above sorting processes is very useful for effectively detecting useful exceptional workflows.

Heretofore, a program, method, and apparatus for modeling workflows according to the present invention have been described by means of illustrated embodiments. This invention is not limited to this and each component may be replaced with a component having the same functions. In addition, other configuration and steps can be desirably added to the invention. In addition, two or more configurations (features) in the above embodiments may be combined.

The processing functions described above can be realized by a general computer. In this case, a program is prepared, which describes processes for the functions to be performed by the workflow analysis devices 100 and 400. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes (MT), etc. The optical discs include DVDs (Digital Versatile Discs), DVD-RAMs, CD-ROMs (Compact Disc Read-Only Memories), CD-R (Recordable)/RW (ReWritable), etc. The magneto-optical recording media include MOs (Magneto-Optical disks) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the workflow modeling program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

The present invention is designed to classify workflows into typical workflows and exceptional workflows depending on the number of appearances of workflow, and to output not only a typical workflow diagram showing the typical workflows but also an exceptional workflow diagram showing the typical workflows and the exceptional workflows. The typical workflow diagram allows business managers and system administrators to institutively confirm the entire workflows. In addition, the exceptional workflow diagram allows the business managers and the system administrators to readily know how the exceptional workflows are involved in the entire workflows. Thus, these workflow models can be very useful for reviewing the business activities and considering the reconstruction of computer systems.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium having stored thereon a workflow modeling program, the workflow modeling program causing a computer to perform a procedure comprising:

consulting an update history information storage unit to generate flow information in which data set names of a plurality of data sets updated in a data update process are arranged in chronological order of updated time, oldest first, for every data update process, and counting a number of appearances of flow information of same in all of the generated flow information, the update history information storage unit storing process identification information uniquely identifying the data update process, a data set name of a data set updated in the data update process, and an updated time of the data set in association with each other, the data update process including update of the plurality of data sets;

arranging workflows represented by the generated flow information in decreasing order of the number of appearances, sequentially selecting the workflows in decreasing order of the number of appearances until an accumulated number of appearances reaches a preset threshold, and classifying the selected workflows as typical workflows and unselected workflows as exceptional workflows;

displaying one of a typical workflow diagram and an exceptional workflow diagram, the typical workflow diagram including nodes corresponding to the data set names and indicating the typical workflows, the exceptional workflow diagram including nodes corresponding to the data set names and indicating the typical workflows and at least one of the exceptional workflows; and switching, in response to user input, a diagram to be displayed from the one of the typical workflow diagram and the exceptional workflow diagram to another one of the typical workflow diagram and the exceptional workflow diagram.

2. The computer-readable medium according to claim 1, wherein the displaying of the exceptional workflow diagram displays a list of information indicative of the exceptional workflows, and when at least one of the exceptional workflows is selected via the user input, displays the exceptional workflow diagram based on the information on all of the typical workflows and information on the selected exceptional workflows.

3. The computer-readable medium according to claim 2, wherein the procedure further comprises calculating a degree of dissociation between each of the exceptional workflows and every typical workflow with respect to a sequence of the data set names and determining a smallest degree of dissociation as a representative distance of the each of the exceptional workflows, and the displaying of the exceptional workflow diagram displays the list of information indicative of the exceptional workflows with the exceptional workflows sorted in decreasing order of representative distance.

4. The computer-readable medium according to claim 2, wherein the procedure further comprises calculating a degree of dissociation between each of the exceptional workflows and every typical workflow with respect to a sequence of the data set names and sorting the each of the exceptional workflows into a typical workflow with a smallest degree of dissociation therebetween, and the displaying of the exceptional workflow diagram displays the list of information indicative of the exceptional workflows on typical workflow basis.

5. The computer-readable medium according to claim 2, wherein the procedure further comprises counting, when a searching sequence that is a sequence of data set names is specified via the user input, a number of appearances of the searching sequence in each of the exceptional workflows, and the displaying of the exceptional workflow diagram displays the list of information indicative of the exceptional workflows with the exceptional workflows sorted in decreasing order of the number of appearances of the searching sequence.

6. The computer-readable medium according to claim 2, wherein the procedure further comprises classifying, when a previous data set name and a subsequent data set name are specified via the user input, exceptional workflows that has the subsequent data set name but does not have the previous data set name as flows not fulfilling conditions, and the displaying of the exceptional workflow diagram displays the list of information indicative of the exceptional workflows with the flows not fulfilling conditions displayed separately.

7. The computer-readable medium according to claim 6, wherein:

the update history information storage unit further stores information on updated contents of the data set updated in the data update process in association with the process identification information and the data set name; and the procedure further comprises searching, when a precondition corresponding to the previous data set name and a postcondition corresponding to the subsequent data set name are further specified via the user input, exceptional workflows that have the previous data set name and the subsequent data set name to detect exceptional workflows in which the updated contents corresponding to the subsequent data set name fulfills the postcondition and the updated contents corresponding to the previous data set name does not fulfill the precondition, and the classifying of exceptional workflows classifies the detected exceptional workflows as the flows not fulfilling conditions.

8. The computer-readable medium according to claim 2, wherein the procedure further comprises classifying exceptional workflows where a same sequence of data set names appears plural times as inefficient flows, and the displaying of the exceptional workflow diagram displays the list of information indicative of the exceptional workflows with the inefficient flows displayed separately.

9. The computer-readable medium according to claim 2, wherein the procedure further comprises classifying exceptional workflows where a same data set name successively appears as inefficient flows, and the displaying of the exceptional workflow diagram displays the list of information indicative of the exceptional workflows with the inefficient flows displayed separately.

10. The computer-readable medium according to claim 1, wherein when a user-designated threshold is entered via user input before the classification of the workflows, the classifying classifies the workflows with the user-designated threshold as the preset threshold.

11. The computer-readable medium according to claim 1, wherein the displaying of the exceptional workflow diagram superimposes at least one of the exceptional workflows on the typical workflows.

12. A workflow modeling method comprising:

consulting an update history information storage unit to generate flow information in which data set names of a plurality of data sets updated in a data update process are arranged in chronological order of updated time, oldest first, for every data update process, and counting a number of appearances of flow information of same in all of the generated flow information, the update history information storage unit storing process identification information uniquely identifying the data update process, a data set name of a data set updated in the data update process, and an updated time of the data set in association with each other, the data update process including update of the plurality of data sets;

arranging, by a processor, workflows represented by the generated flow information in decreasing order of the number of appearances, sequentially selecting the workflows in decreasing order of the number of appearances until an accumulated number of appearances reaches a preset threshold, and classifying the selected workflows as typical workflows and unselected workflows as exceptional workflows;

displaying one of a typical workflow diagram and an exceptional workflow diagram, the typical workflow diagram including nodes corresponding to the data set names and indicating the typical workflows, the exceptional workflow diagram including nodes corresponding to the data set names and indicating the typical workflows and at least one of the exceptional workflows; and switching, in response to user input, a diagram to be displayed from the one of the typical workflow diagram and the exceptional workflow diagram to another one of the typical workflow diagram and the exceptional workflow diagram.

13. The workflow modeling method according to claim 12, wherein the displaying of the exceptional workflow diagram superimposes at least one of the exceptional workflows on the typical workflows.

14. A workflow modeling apparatus comprising:
- an update history information storage unit storing process identification information uniquely identifying a data update process, a data set name of a data set updated in the data update process, and an updated time of the data set in association with each other, the data update process including update of a plurality of data sets;
- a workflow extractor for consulting the update history information storage unit to generate flow information in which data set names of the plurality of data sets updated in the data update process are arranged in chronological order of updated time, oldest first, for every data update process, and counting a number of appearances of flow information of same in all of the generated flow information;
- a workflow classification unit for arranging workflows represented by the flow information generated by the workflow extractor in decreasing order of the number of appearances, sequentially selecting the workflows in decreasing order of the number of appearances until an accumulated number of appearances reaches a preset threshold, and classifying the selected workflows as typical workflows and unselected workflows as exceptional workflows; and
- a workflow model display unit for displaying one of a typical workflow diagram and an exceptional workflow diagram, and switching, in response to user input, a diagram to be displayed from the one of the typical workflow diagram and the exceptional workflow diagram to another one of the typical workflow diagram and the exceptional workflow diagram, the typical workflow diagram including nodes corresponding to the data set names and indicating the typical workflows, the exceptional workflow diagram including nodes corresponding to the data set names and indicating the typical workflows and at least one of the exceptional workflows.

15. The workflow modeling apparatus according to claim 14, wherein the displaying of the exceptional workflow diagram superimposes at least one of the exceptional workflows on the typical workflows.

* * * * *